United States Patent
Tsuchiyama et al.

(10) Patent No.: US 7,038,883 B2
(45) Date of Patent: May 2, 2006

(54) MAGNETIC HEAD SLIDER, SUPPORT THEREFOR AND MAGNETIC DISK UNIT

(75) Inventors: Ryuji Tsuchiyama, Matsudo (JP);
Hidekazu Kohira, Ninomiya (JP);
Masaaki Matsumoto, Fujisawa (JP);
Kiyoshi Hashimoto, Odawara (JP);
Junguo Xu, Chiyoda (JP)

(73) Assignee: Hitachi Golbal Storage Technologies Japan, Ltd., Tokyo (JP)

( * ) Notice: Subject to any disclaimer, the term of this patent is extended or adjusted under 35 U.S.C. 154(b) by 87 days.

(21) Appl. No.: 10/385,674

(22) Filed: Mar. 12, 2003

(65) Prior Publication Data
US 2003/0218832 A1   Nov. 27, 2003

(30) Foreign Application Priority Data
Mar. 12, 2002   (JP) ............................. 2002-066388

(51) Int. Cl.
*G11B 5/60*   (2006.01)
(52) U.S. Cl. .............. 360/235.6; 360/235.7; 360/235.8; 360/236

(58) Field of Classification Search ............. 360/235.8, 360/235.6, 235.7, 236, 236.6, 236.4, 236.5, 360/236.3
See application file for complete search history.

(56) References Cited

U.S. PATENT DOCUMENTS

2002/0008939 A1 *   1/2002   Boutaghou et al. ...... 360/235.8

* cited by examiner

*Primary Examiner*—Robert S. Tupper
(74) *Attorney, Agent, or Firm*—Antonelli, Terry, Stout and Kraus, LLP.

(57) ABSTRACT

A magnetic head slider mounted on a magnetic disk unit for supporting a magnetic head that writes and reads information to and from a magnetic disk is constructed such that a depth $\delta s1$ from the surfaces of leading and trailing pads, which come into contact with a medium surface when the disk is at rest, to stepped surfaces formed on the air inflow side of the leading pads, a depth $\delta s2$ from the contact surfaces to stepped surfaces formed on the air inflow side of the trailing pad and a step depth $\delta s3$ from the contact surfaces to the surfaces of side rails are in a relation of $\delta s1 \leq \delta s2 \leq \delta s3$. With this arrangement, the slider can follow the waved medium surface at a low flying height with a small flying height fluctuation, thus realizing high density recording, high reliability and reduced cost of the magnetic disk unit.

12 Claims, 24 Drawing Sheets

ABS1 (UNIT : mm)

ABS10 (UNIT : mm)

(UNIT : mm)

ABS91

ABS92

ABS93

ABS94

ABS95

ABS96

ABS97

ABS98

ABS99

MAGNETIC HEAD SLIDER, SUPPORT THEREFOR AND MAGNETIC DISK UNIT

BACKGROUND OF THE INVENTION

The present invention relates to a magnetic head slider, a support therefor and a magnetic disk unit, and more particularly to a magnetic head slider, a support therefor and a magnetic disk unit that are excellent for enhancing a recording density and reliability.

In magnetic disk units, demands for higher reliability on a head-disk interface and for minimization on a flying height are growing more and more exacting in recent years.

As a surface recording density increases year by year, a required flying height tends to decrease. Particularly when the flying height is less than 30 nm, a possibility arises that a head will be in intermittent or continuous contact with a media surface.

A measure to solve this problem is to reduce a flying height hto at the beginning of contact of a slider surface with the media surface, thereby increasing a flying margin. A possible factor contributing to increasing the flying height hto at the beginning of contact with the media surface is deemed to be large changes in the flying height with respect to a media surface waviness of a sufficiently large wavelength as compared with a slider length and a microwaviness of a wavelength almost equal to the slider length.

A conventional flying-recording type magnetic head slider described in JP-A-6-325530 is comprised of a air bearing surface, which may contact a media surface when the disk is at rest and serve as an air bearing surface, and a stepped surface bounded on the air bearing surface in an air inflow direction with a step therebetween.

The depth $\delta s$ of the step is less than 500 nm, and a ratio between a length L of the slider in the air inflow direction and a width W thereof in a direction perpendicular to the air inflow direction is 0.3 or less. This construction realizes a flying characteristic that keeps the flying height from changing when a circumferential speed changes.

A conventional magnetic head slider disclosed in U.S. Pat. No. 5,777,825 is comprised of two air-bearing pads formed on the inflow side, another air-bearing pad on the outflow side, and two side rails formed along both lateral sides.

A subambient pressure force generated in a region enclosed by the air-bearing pads and side rails enables a reduction of flying height changes due to atmospheric pressure fluctuations around the slider to be reduced.

BRIEF SUMMARY OF THE INVENTION

The conventional magnetic head sliders described above have large flying height changes with respect to a media surface waviness of a long wavelength, such as runout, and a microwaviness of a wavelength almost equal to the slider lengths, and thus cannot follow them without contacting of their slider surfaces. This makes it impossible to reduce the flying height hto at the beginning of contact with the media surface.

It is an object of the present invention to provide a magnetic head slider, a support therefore and a magnetic disk unit, in which flying height changes with respect to a media surface waviness of a long wavelength, such as runout, and a microwaviness of a wavelength roughly equal to the slider length are reduced without increasing flying height changes due to atmospheric pressure fluctuations around the slider, thereby providing a flying characteristic that is adapted to a high recording density of the media surface.

To achieve the above objective, the magnetic head slider of the invention comprises two leading pads formed on an air inflow side of a slider body, a trailing pad formed on an air outflow side of the slider body, and a pair of side rails formed along both lateral sides of the slider body, and features having a relation of $\delta s1 < \delta s2 < \delta s3$ or $\delta s1 = \delta s2 < \delta s3$, where $\delta s1$ is a depth from contact surfaces of the leading and trailing pads, which come into contact with a medium surface when a disk is at rest, to the stepped surfaces formed on an air inflow side of the leading pads, $\delta s2$ is a depth from the contact surfaces to the stepped surface formed on the air inflow side of the trailing pad, and $\delta s3$ is a step depth from the contact surfaces to the surfaces of the side rails.

According to the invention, the step depths of the leading pads, trailing pad and side rails of the magnetic head slider are set such that a relationship of $\delta s1 < \delta s2$ or $\delta s1 = \delta s2$ is satisfied and $\delta s3$ is larger than $\delta s1$ and $\delta s2$. This reduces the absolute value of a subambient pressure force generated on the back surface of the slider, and allows the areas of the contact surfaces of the leading and trailing pads to be reduced without lowering the flying height. The reduction in the areas of the contact surfaces provides the slider that, even if the surface of a disk or recording media has a waviness, such as runout, follows the surface waviness without contacting the disk surface and also maintains a low flying height with a small flying height change.

The use of such a magnetic head slider, which follows the media surface waviness while maintaining a low flying height, provides a magnetic head slider support and a magnetic disk unit that enables an enhanced recording density, improved reliability and reduced cost.

Other objects, features and advantages of the present invention will become apparent from the following description of embodiments of the invention taken in conjunction with the accompanying drawings.

DETAILED DESCRIPTION OF THE INVENTION

Figure 1:
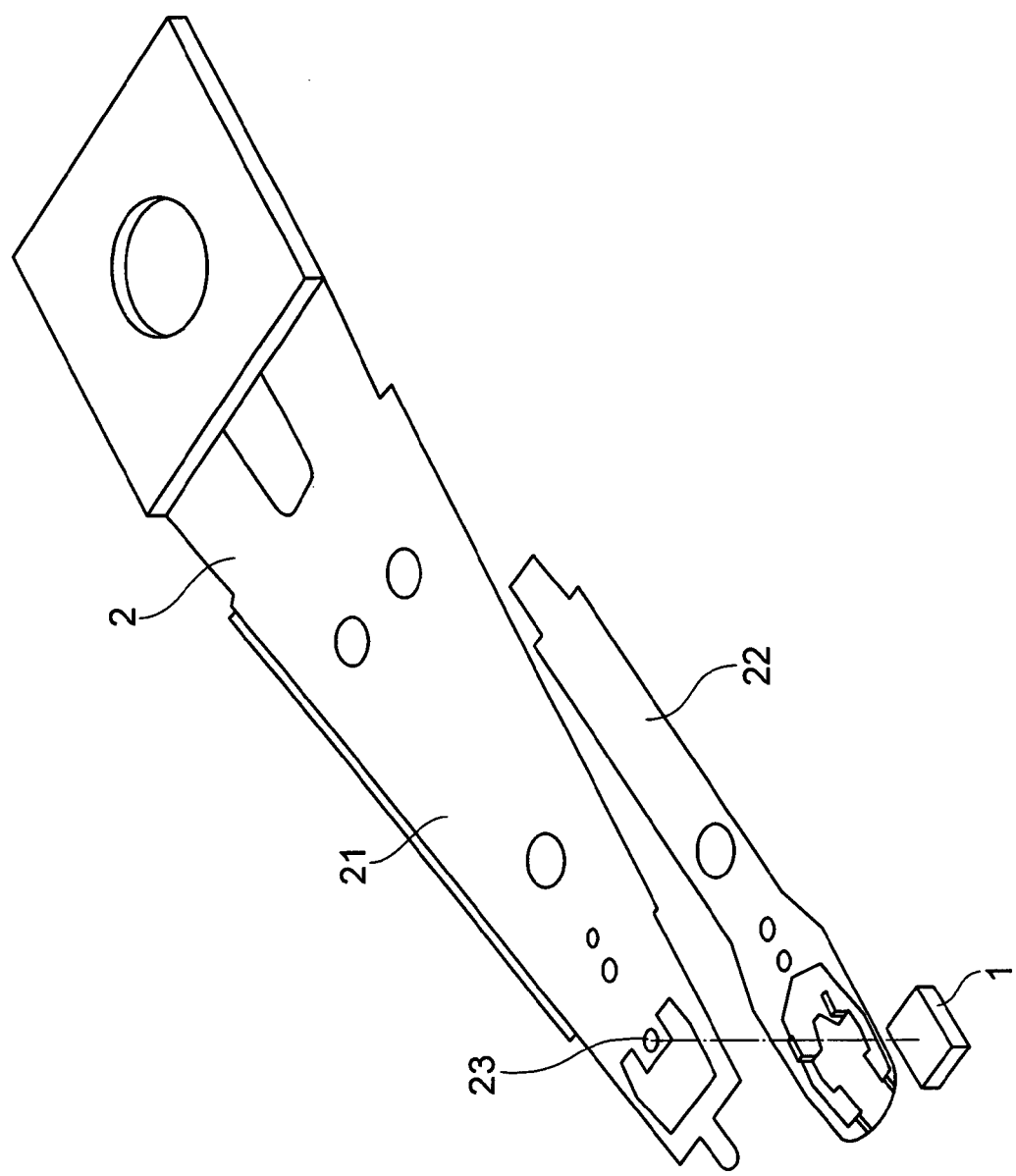
FIG. 1 is a perspective view showing the magnetic head slider and its support according to the first embodiment of the invention.

Briefing embodiments of the invention, in a magnetic head slider 1 of FIG. 2, for contact surfaces (contact surfaces of a leading pad 11 and a trailing pad 12) when the slider comes into contact with a disk, a relation among a stepped surface depth ($\delta$s1) on the air inflow side of the leading pad 11, a stepped surface depth ($\delta$s2) on the air outflow side of the trailing pad 12 and a stepped surface depth ($\delta$s3) of side rails 13 is set to be $\delta s1 < \delta s2 < \delta s3$ or $\delta s1 = \delta s2 < \delta s3$.

The above construction reduces the absolute value of a subambient pressure force on the back side of the slider, making it possible to reduce the contact area of each pad. This provides the slider which, if there is a waviness such as runout on the disk surface, follows the surface waviness without contacting the disk and keeps a low flying height and which has small fluctuations in the flying height.

Figure 2A:
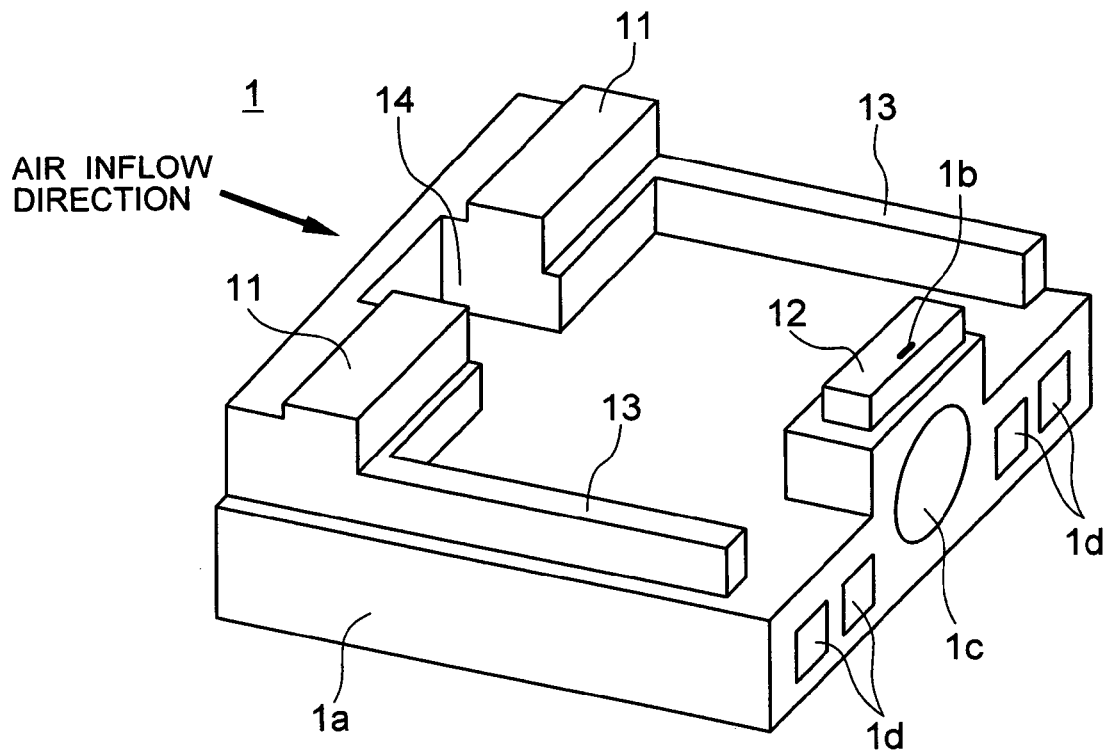
FIG. 2A is a perspective view of the magnetic head slider of the first embodiment of the invention.
Figure 2B:
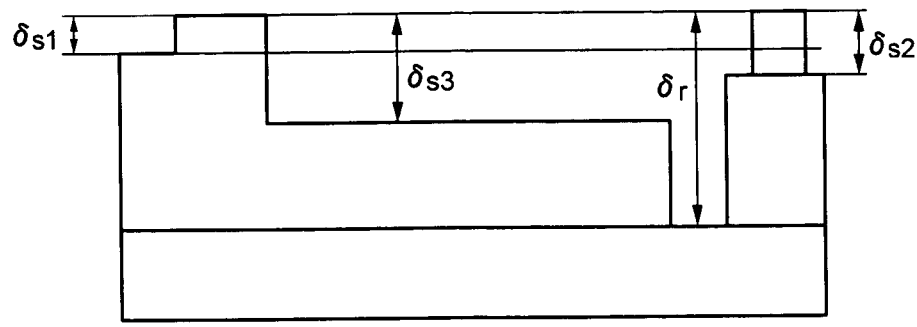
FIG. 2B is a side view thereof.

Now, the embodiments of the invention will be described with reference to the accompanying drawings. FIG. 1 is a perspective view of the magnetic head slider and its support according to the first embodiment of the invention. FIG. 2A and FIG. 2B are a perspective view and a side view, respectively, of the magnetic head slider of the first embodiment of the invention.

The slider 1 is comprised of a slider body 1a, two (paired) pads 11 formed on the air inflow side, which may serve as air bearing surfaces (also referred to as leading trailing pads hereinafter), the pad 12 formed on the air outflow side, which may serve as an air bearing surface (also referred to as a trailing pad hereinafter), and a pair of side rails 13 formed along both sides of the slider.

At a trailing edge of the trailing pad 12, a write/read element 1b comprised of an exposed portion of an MR element of an MR (magneto-resistive) read head and a gap portion of an electromagnetic induction type write head are provided. Further, on a rear end surface of the slider 1, a magnetic head 1c and connection terminals 1d are provided.

The slider 1 is a subambient pressure force utilizing type slider in which a subambient pressure force Q2 is produced in a recess 14 enclosed by the two leading pads 11, which aerodynamically generates a positive pressure force Q1, and by the pair of side rails 13. The subambient pressure force Q2 is produced because, as the disk turns, air flows in between the slider and the disk and rapidly expands in volume in the recess 14. The positive pressure force Q1 acts to increase the flying height, and the subambient pressure force Q2 acts to lower the flying height.

Figure 3:
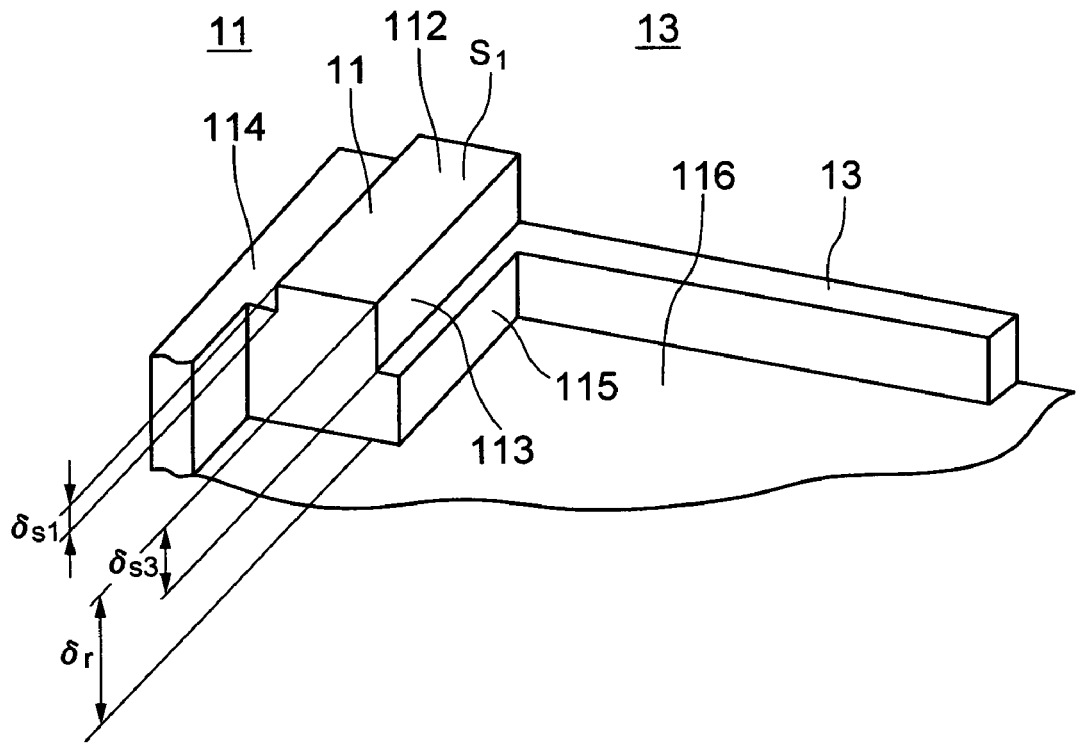
FIG. 3 is a perspective view showing a leading pad and a side rail of the magnetic head slider of the first embodiment of the invention.
Figure 4:
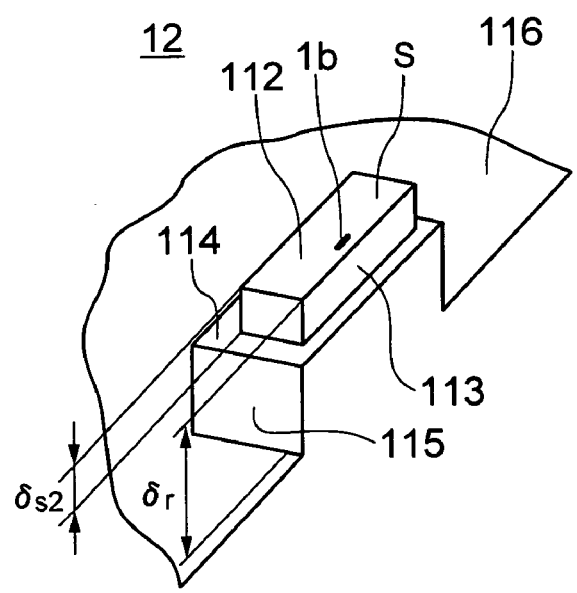
FIG. 4 is a perspective view showing a trailing pad of the magnetic head slider of the first embodiment of the invention.

In FIG. 3 and FIG. 4, the leading pad 11, the side rail 13 and the trailing pad 12 in the first embodiment of the invention are shown. These are defined by a pad surface 112 (contact surface), which contacts the media surface when the disk is at rest, and two stepped surfaces, a first stage stepped surface 114 (step surface) provided on the air inflow side and a second stage stepped surface 116 (recessed surface) provided with stepped portions 113, 115 interposed therebetween.

As to a distance between the contact surface and each stepped surface, or depth, $\delta s1$ represents a depth of the stepped surface 114 from the pad surface 112 of the leading pad 11 (step depth), $\delta s3$ a depth of the side rail 13 from the pad surface 112 (step depth), $\delta s2$ a depth of the stepped surface 114 from the pad surface 112 of the trailing pad 12 (step depth), and $\delta r$ a depth of the stepped surface 116 from the pad surface 112 (recess depth).

Further, in this embodiment, the leading pad step depth $\delta s1$, the trailing pad step depth $\delta s2$, and the side rail step depth $\delta s3$ are set to increase in the order of $\delta s1$, $\delta s2$ and $\delta s3$. S1 and S represent the areas of the contact surfaces of the leading pad 11 and the trailing pad 12, respectively.

Figure 5:
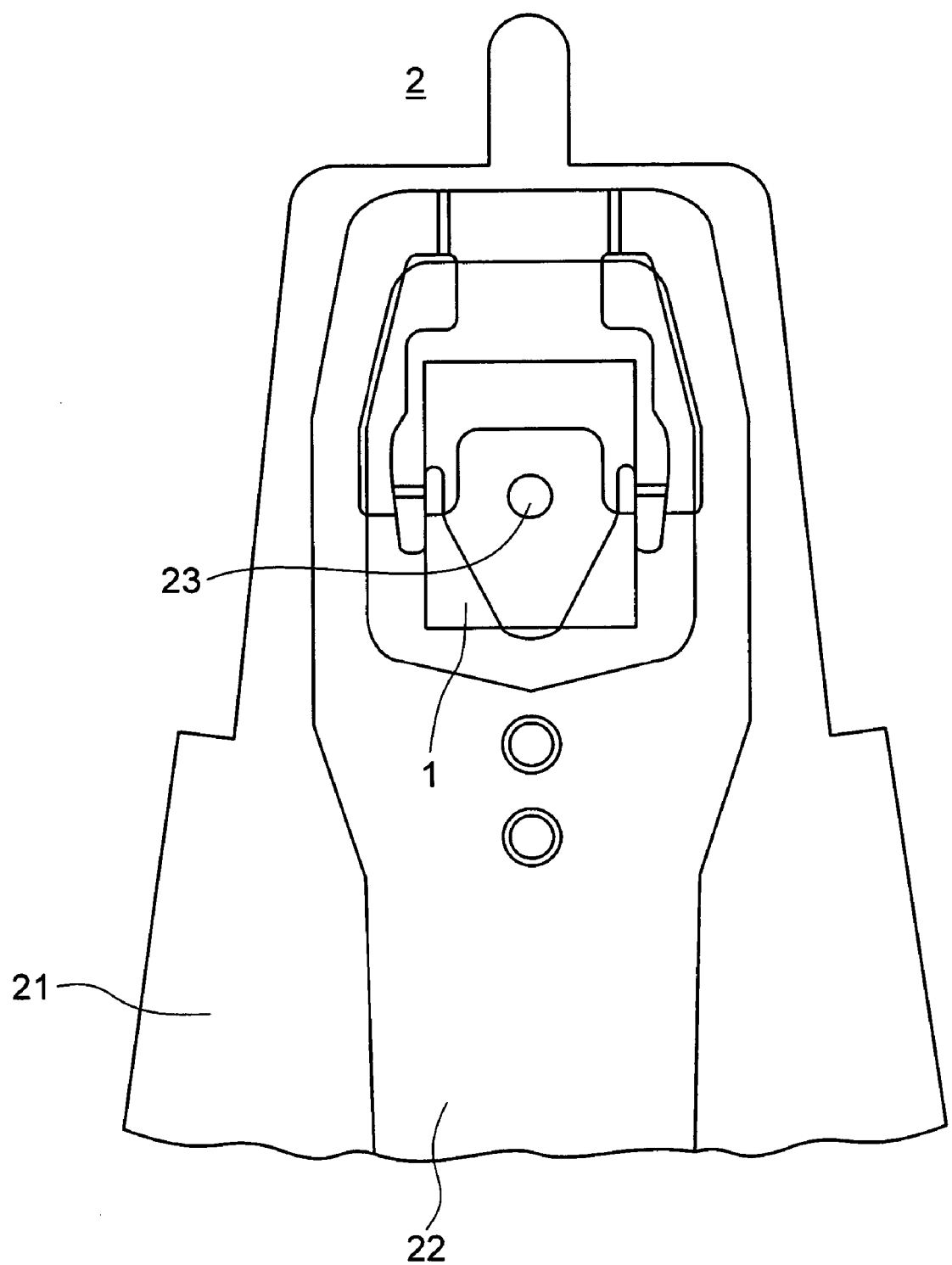
FIG. 5 is a plan view showing the magnetic head slider support of the first embodiment of the invention.

FIG. 5 shows a plan view of the magnetic head slider support (also called as a suspension) of this embodiment. The support 2 is comprised of a load beam portion 21, a gimbal portion 22, a load protrusion portion (also called as dimple) 23, etc.

Figure 6A:
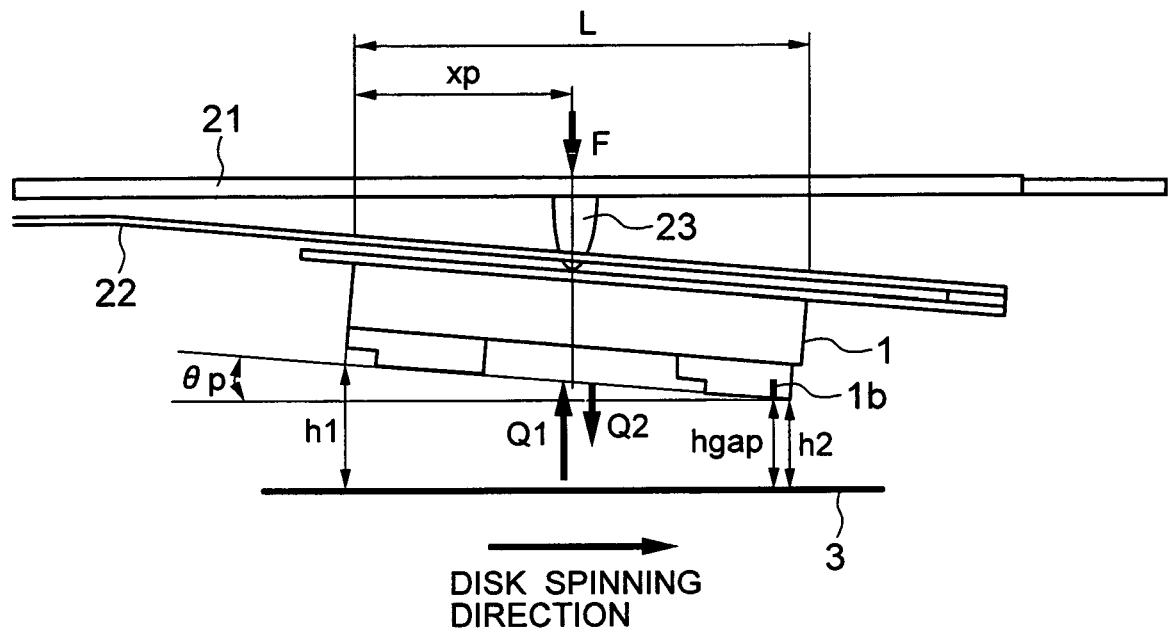
FIG. 6A and FIG. 6B are side views showing the magnetic head slider of the first embodiment of the invention while running and flying.
Figure 6B:
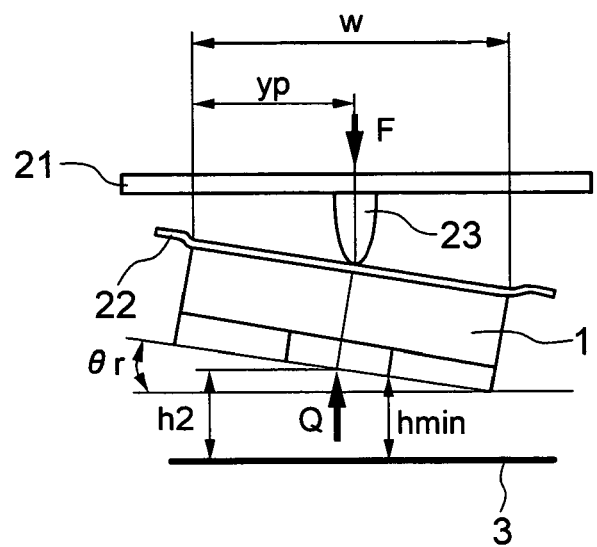

FIGS. 6A and 6B are side views showing the magnetic head slider of this embodiment as it flies and runs. The dimple 23 is provided as a load exerting point through which a load F applied from the load beam portion 21 acts on the slider. This dimple also serves as a fulcrum through which the slider is applied a righting moment with respect to its movements of three degrees of freedom in a translation (vertical) direction, in a pitch (longitudinal) direction and in a roll (seek) direction.

A position of the dimple 23, which works as a load exerting point, (Xp, Yp), is expressed as a dimensionless value, with Xp=xp/L in the pitch direction and Yp=yp/w in the roll direction, where xp is a distance from the leading edge of the slider, yp is a distance from the side end of the slider, L is a longitudinal length of the slider and w is a lateral length of the slider.

At the position of the dimple 23 the suspension preload F and the aerodynamically generated air-bearing force Q are balanced in a relation of F=Q and Q=Q1−Q2 (Q2>0), and the slider 1 is stably flying with its attitude in the pitch and roll directions held constant. That is, the slider 1 is flying dynamically stably while keeping constant a pitch attitude angle $\theta p$, a roll attitude angle $\theta r$, a flying height h1 at the leading edge of the slider and a flying height h2 at the trailing edge of the slider, all defining the flying attitude.

Figure 7:
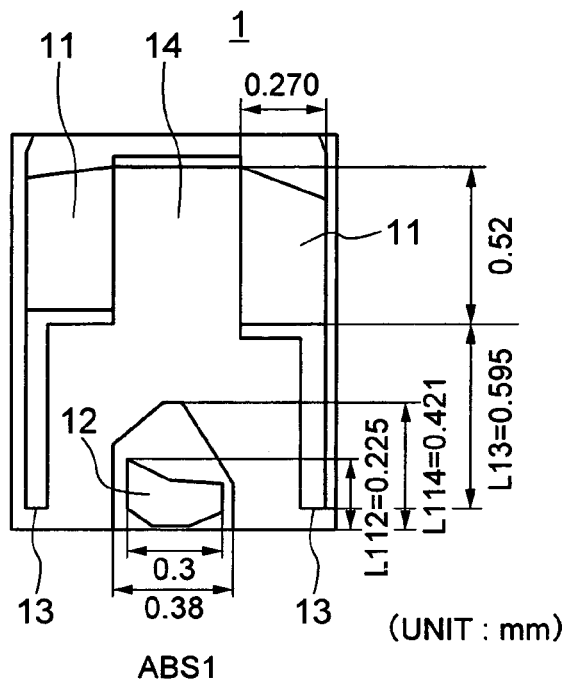
FIG. 7 is a schematic diagram showing the air bearing surface configuration ABS1 of the magnetic head slider of the first embodiment of the invention.

FIG. 7 shows the air bearing surface configuration (ABS1) of the magnetic head slider of this embodiment. The slider is of a pico-size having a length L of 1.25 mm. The suspension preload F is 1.4 mN, the dimple positions xp/L and yp/L are both 0.5. The length L112 of the contact surface 112 of the trailing pad 12 is 0.225, the length L114 of the stepped surface 114 relative to the pad surface 112 of the trailing pad 12 is 0.421, the length L13 of the side rails 13 is 0.595, and the ratio of an area S of the trailing pad contact surface 112 to the area S1 of the leading pad contact surface 112 is 0.164.

Figure 8:
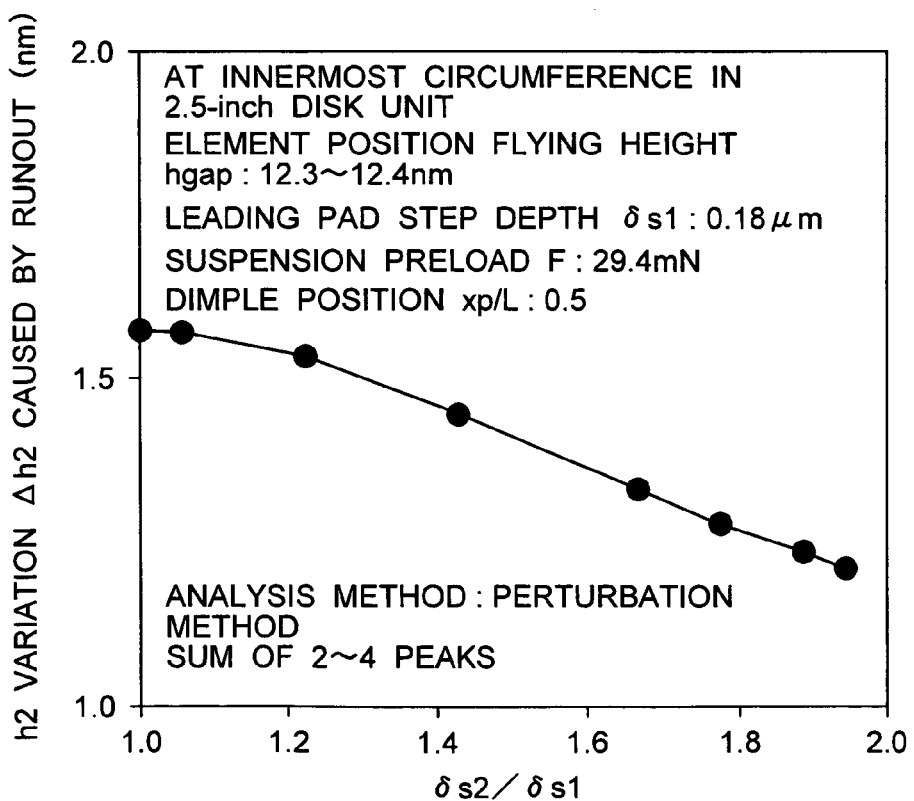
FIG. 8 is a graph showing a calculation result of a fluctuation $\Delta h2$ in a flying height $h2$ at the slider trailing edge with respect to $\delta s2/\delta s1$ for the magnetic head slider of the first embodiment of the invention.

FIG. 8 shows a calculation result of, for the air bearing surface configuration ABS1, a fluctuation $\Delta h2$ in the flying height h2 at the slider trailing edge with respect to a ratio of the trailing pad step depth $\delta s2$ to the leading pad step depth $\delta s1$, $\delta s2/\delta s1$, when the slider is running over a media surface that has a waviness of a long wavelength compared with the slider length and a large amplitude, such as runout. This calculation was made by assuming that a slider altitude was 0 m, that a revolution speed and a radius position were those at the innermost circumference of a 2.5-inch disk unit, that the flying height hgap at the element position was 12.3–12.4 nm, and that the leading pad step depth was kept constant at $\delta s1=0.18$ μm.

Figure 9:
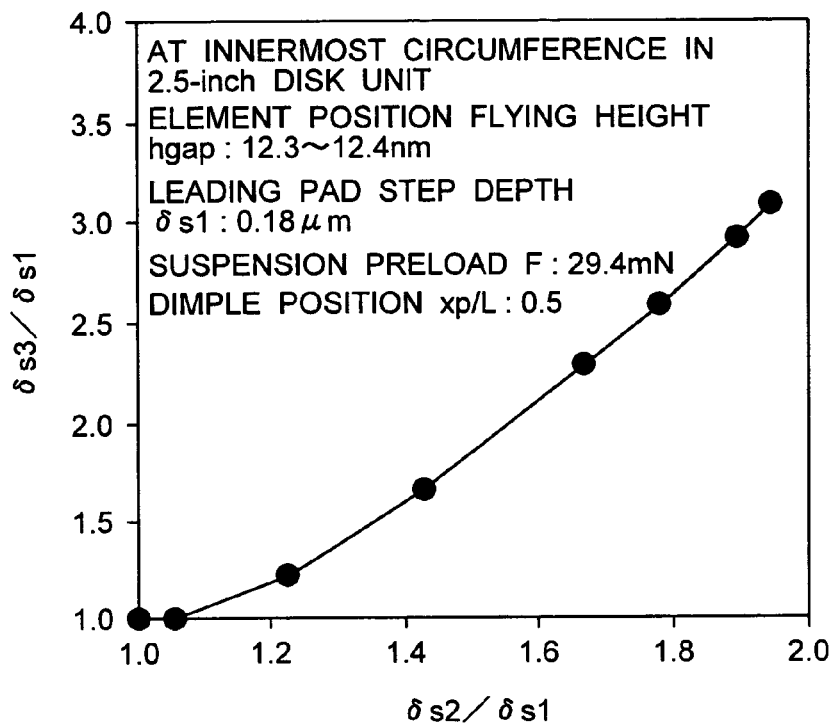
FIG. 9 is a graph showing a calculation result of δs3/δs1 with respect to δs2/δs1 for the magnetic head slider of the first embodiment of the invention.

As a measure to keep the element position flying height hgap constant at 12.3–12.4 nm, the ratio of the side rail step depth $\delta s3$ to the leading pad step depth $\delta s1$, $\delta s3/\delta s1$, was changed as shown in FIG. 9.

The calculation of $\Delta h2$ was such that a ratio of $\Delta h2$ to the waviness amplitude a of the media surface, $\Delta h2/a$, was numerically calculated for each waviness frequency during second to fourth resonance, the calculated value of $\Delta h2/a$ was multiplied with the waviness amplitude a for an actually measured waviness frequency during each resonance, and the results $\Delta h2$ for the second to fourth resonance were summed up.

It has been known from FIG. 8 and FIG. 9 that when $\delta s2/\delta s1$ and $\delta s3/\delta s1$ are increased, with hgap kept almost constant, the flying height change $\Delta h2$ at the slider trailing edge due to the media surface waviness of a long wavelength, such as runout, can be reduced.

Figure 10:
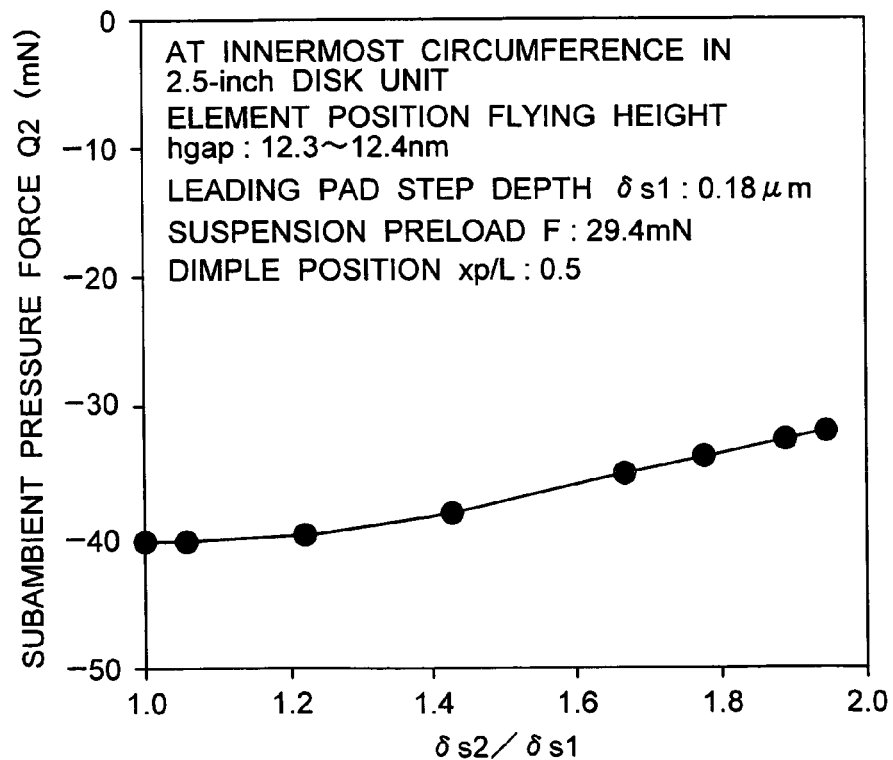
FIG. 10 is a graph showing a calculation result of a subambient pressure force with respect to δs2/δs1 for the magnetic head slider of the first embodiment of the invention.

FIG. 10 shows a calculated result of a subambient pressure force Q2 with respect to $\delta s2/\delta s1$ for the air bearing surface configuration ABS1. This was calculated by assuming that a revolution speed and a radius position of the slider were those at the innermost circumference of a 2.5-inch disk unit, that the element position flying height hgap was 12.3–12.4 nm, and that the leading pad step depth was kept constant at $\delta s1=0.18$ μm. It is seen from FIG. 9 and FIG. 10 that increasing the values of $\delta s2/\delta s1$ and $\delta s3/\delta s1$ results in a reduction in the absolute value of the subambient pressure force Q2. When the absolute value of the subambient pressure force Q2 decreases, the flying height increases. That is, the reason why the flying height increases when $\delta s2/\delta s1$ and $\delta s3/\delta s1$ increase is that the increase in $\delta s2/\delta s1$ and $\delta s3/\delta s1$ causes the absolute value of the subambient pressure force Q2 to decrease.

Figure 11:
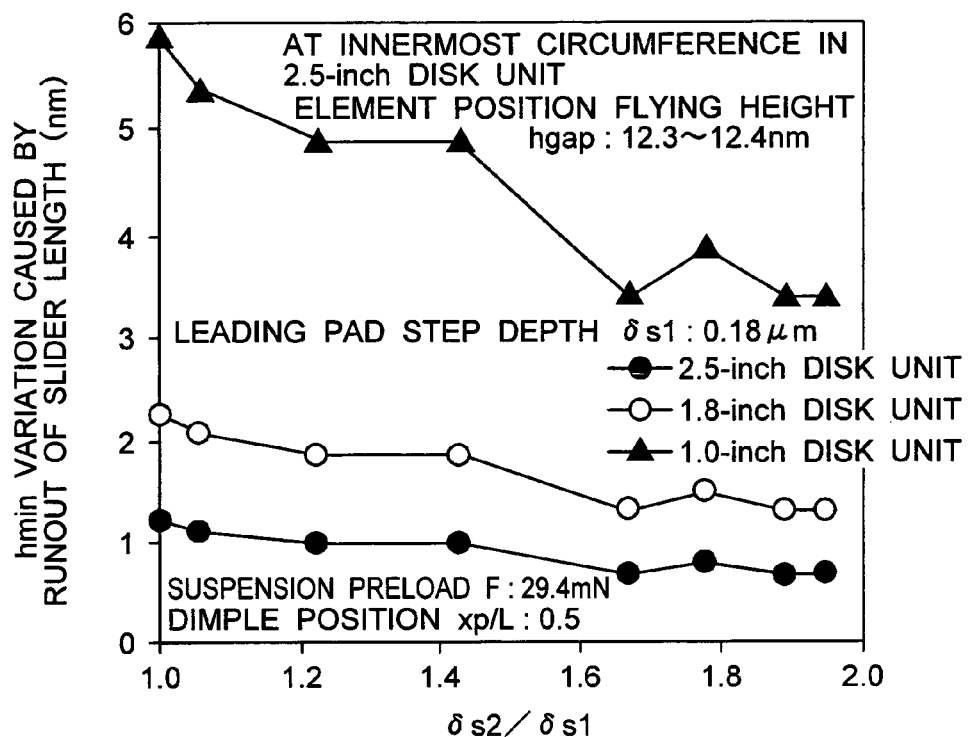
FIG. 11 is a graph showing a calculation result of a fluctuation in a minimum flying height hmin caused by a microwaviness with respect to δs2/δs1 for the magnetic head slider of the first embodiment of the invention.

FIG. 11 shows a calculation result of, for the air bearing surface configuration ABS1, a fluctuation in the minimum flying height hmin due to a geometrically unfollowable microwaviness of a wavelength almost equal to the slider length and a small amplitude with respect to $\delta s2/\delta s1$. The calculation was made by assuming that a slider altitude was 0 m, that a revolution speed and a radius position were those at the innermost circumference of a 2.5-inch disk unit, that the element position flying height gap hgap was 12.3–12.4 nm, and that the leading pad step depth was kept constant at $\delta s1=0.18$ µm. At the innermost circumference radius position in 2.5-, 1.8- and 1.0-inch disk units, heights of microwaviness of a wavelength nearly equal to the slider length were measured. They measured 5 nm, 9.4 nm and 24.5 nm and increased in inverse proportion to a square of the radius. The calculation of the fluctuation in the minimum flying height hmin in the 2.5-inch disk unit was made such that, from a flying height change relative to a slider crown height change, a fluctuation in the minimum flying height hmin in the 2.5-inch disk unit due to a unit microwaviness height was calculated, and this calculated fluctuation was multiplied with the microwaviness height of 5 nm in the 2.5-inch disk unit. Also shown in the figure is a result of fluctuations in the minimum flying height hmin for the 1.8- and 1.0-inch disk units, which were determined by multiplying the fluctuation in the minimum flying height hmin in the 2.5-inch disk unit caused by the unit microwaviness height with the microwaviness heights of 9.4 nm and 24.5 nm for the 1.8- and 1.0-inch disk units. From FIG. 9 and FIG. 11, it is seen that the fluctuation in the minimum flying height hmin due to a geometrically unfollowable microwaviness of a wavelength nearly equal to the slider length can be reduced when $\delta s2/\delta s1$ and $\delta s3/\delta s1$ are increased. This effect is greater for the 1.8- and 1.0-inch disk units that have smaller radii.

Figure 12:
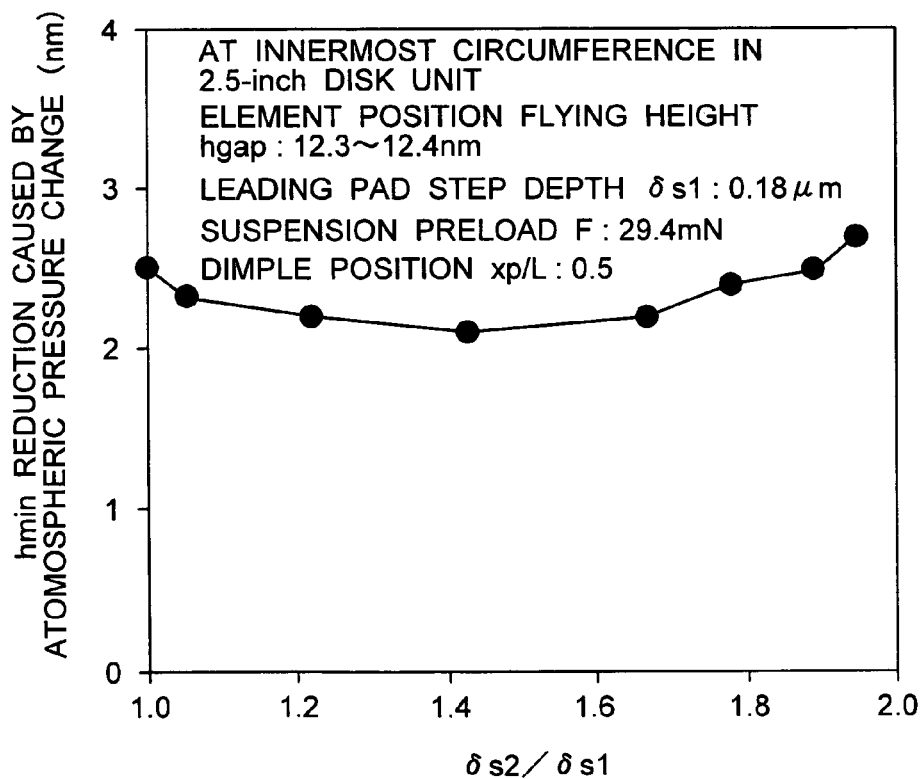
FIG. 12 is a graph showing a calculation result of a reduction in the minimum flying height hmin caused by atmospheric changes around the slider with respect to δs2/δs1 for the magnetic head slider of the first embodiment of the invention.

FIG. 12 shows a calculation result of, for the air bearing surface configuration ABS1, a reduction in the minimum flying height hmin with respect to $\delta s2/\delta s1$ when an atmospheric pressure around the slider changes from an altitude of 0 m to an altitude of 3000 m. This calculation was made by assuming that a revolution speed and a radius position were those at the innermost circumference of a 2.5-inch disk unit, that the element position flying height gap hgap was 12.3–12.4 nm, and that the leading pad step depth was kept constant at $\delta s1=0.18$ µm. FIG. 9 and FIG. 12 show that when $\delta s2/\delta s1$ and $\delta s3/\delta s1$ are increased, the hmin reduction caused by atmospheric changes does not increase and that the hmin reduction caused by atmospheric changes when $\delta s2/\delta s1=1.889$ and $\delta s3/\delta s1=2.944$ is equal to a hmin reduction observed in the conventional art when $\delta s2/\delta s1=\delta s3/\delta s1=1$. Therefore, decreasing of the absolute value of the subambient pressure force Q2 does not cause the hmin reduction due to atmospheric pressure changes to increase.

Figure 13:
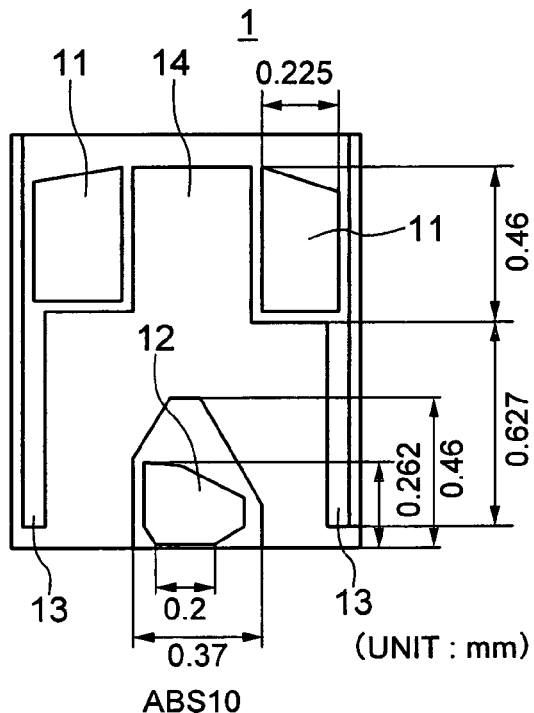
FIG. 13 is a schematic diagram showing the air bearing surface configuration ABS10 of a magnetic head slider as an example 1 for comparison.

Next, referring to FIG. 13 to FIG. 15, the working mechanism of the magnetic head slider of the embodiment will be explained. FIG. 13 shows the air bearing surface ABS10 configuration of a magnetic head slider as an example 1 for comparison. The slider is of a pico-size having a length L of 1.25 mm. Its step depths $\delta s1$, $\delta s2$, $\delta s3$ are equal to each other. The ratio of an area S of the contact surface 112 of the trailing pad 12 to an area S1 of the contact surface 112 of the leading pads 11, S/S1, is 0.303.

Figure 14:
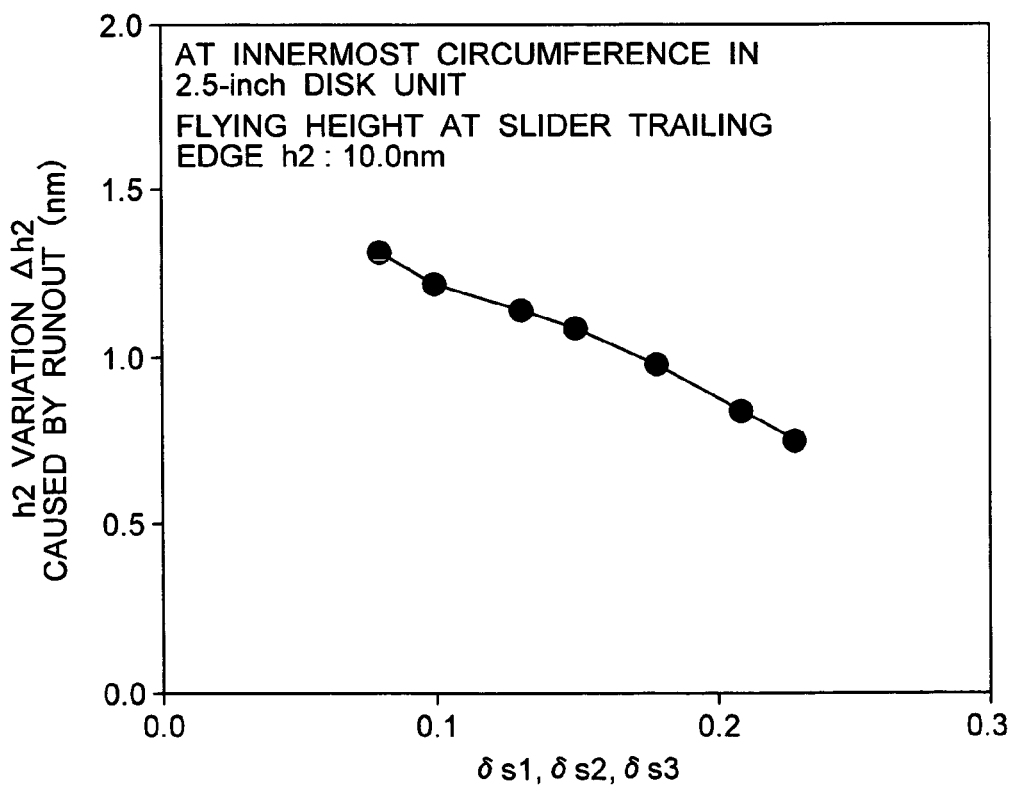
FIG. 14 is a graph showing a calculation result of a fluctuation Δh2 in a flying height h2 at the slider trailing edge with respect to δs2/δs1 for the magnetic head slider of the comparison example 1.

FIG. 14 shows a calculation result of, for the air bearing surface configuration ABS10, a fluctuation $\Delta h2$ in the flying height h2 at the slider trailing edge with respect to the step depth $\delta s1$ ($=\delta s2 =\delta s3$) when the slider is running over a media surface waviness that is of a long wavelength compared with the slider length and a large amplitude, such as runout. This calculation was made on the assumption that a slider altitude was 0 m, that a revolution speed and a radius position were those at the innermost circumference of a 2.5-inch disk unit, that the flying attitude was fixed and that the flying height h2 at the slider trailing edge was held constant at 10 nm (a pressure center position and a air-bearing force were of arbitrary values). The method of calculating $\Delta h2$ is the same as that shown in FIG. 8.

It has been known from FIG. 14 that, under the condition of a constant h2, increasing the step depth can reduce the flying height fluctuation $\Delta h2$ at the slider trailing edge caused by a medium surface waviness of a long wavelength, such as runout. This is because that when the slider is running over a media surface waviness of a long wavelength such as runout, a pressure fluctuation occurs between the slider air bearing surface and the waved media surface to cause a flying height fluctuation. When the stepped surface, which forms the air bearing surface where a pressure fluctuation occurs, has a greater distance from the media surface, there is a smaller flying height fluctuation.

In this embodiment, only the high-pressure trailing pad step depth $\delta s2$, which is most effective for this end, is increased to cause only the trailing pad stepped surface, whose pressure fluctuation is large, to be a greater distance away from the media surface. This arrangement successfully reduces the flying height fluctuation caused by the media surface waviness of a long wavelength such as runout. This arrangement also reduces geometrically the flying height fluctuation caused by a microwaviness of a wavelength almost equal to that of the slider length and a small amplitude.

Figure 15A:
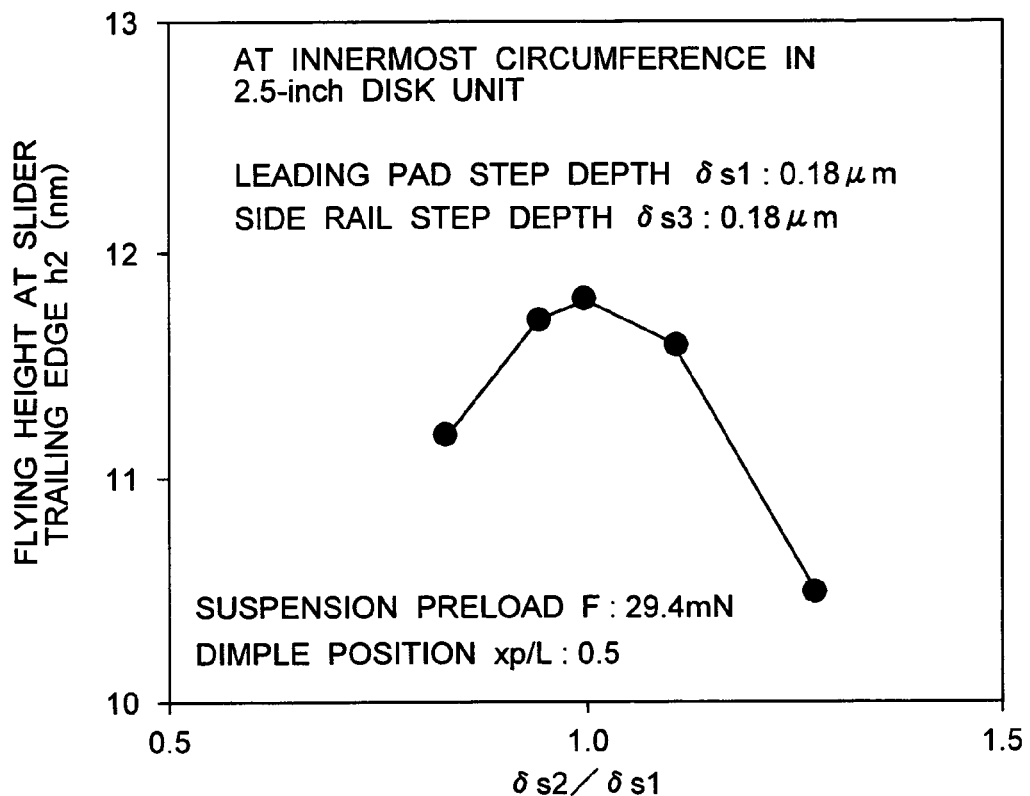
FIG. 15A is a graph showing a calculation result of a flying height h2 at the slider trailing edge with respect to δs2/δs1 for the magnetic head slider of the first embodiment of the invention.

FIG. 15A shows a calculation result of, for the air bearing surface configuration ABS1, a flying height h2 at the slider trailing edge with respect to a ratio of the trailing pad step depth $\delta s2$ to the leading pad step depth $\delta s1$, $\delta s2/\delta s1$. This was calculated by assuming that the slider altitude was 0 m, that a revolution speed and a radius position were those at the innermost circumference of a 2.5-inch disk unit, and that the leading pad step depth $\delta s1$ and the side rail step depth $\delta s3$ were both held constant at 0.18 µm. As shown in FIG. 15A, it is seen that increasing $\delta s2/\delta s1$ reduces the flying height h2 at the slider trailing edge.

Figure 15B:
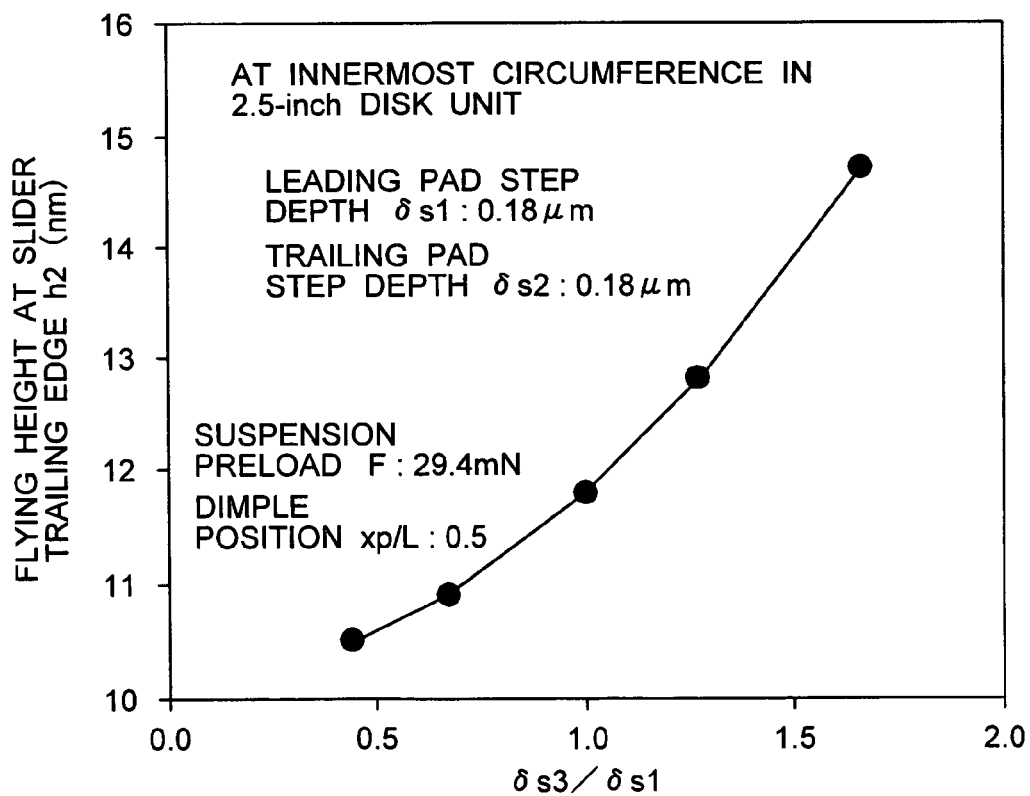
FIG. 15B is a graph showing a flying height h2 at the slider trailing edge with respect to δs3/δs1.

FIG. 15B shows a calculation result of, for the air bearing surface configuration ABS1, a flying height h2 at the slider trailing edge with respect to a ratio of the side rail step depth $\delta s3$ to the leading pad step depth $\delta s1$, $\delta s3/\delta s1$. This calculation was made by assuming that the slider altitude was 0 m, that a revolution speed and a radius position were those at the innermost circumference of a 2.5-inch disk unit, and that the leading pad step depth $\delta s1$ and the trailing pad step depth $\delta s2$ were both held constant at 0.18 µm. As shown in FIG. 15B, it is seen that when $\delta s3/\delta s1$ is increased, the flying height h2 at the slider trailing edge increases.

This invention successfully reduces the flying height fluctuation due to caused by a media surface waviness of a long wavelength, such as runout, by increasing $\delta s2/\delta s1$ and $\delta s3/\delta s1$ under the condition of hgap kept almost constant. This arrangement also reduces geometrically the flying height fluctuation caused by a microwaviness of a wavelength almost equal to that of the slider length and a small amplitude.

Figure 16A:
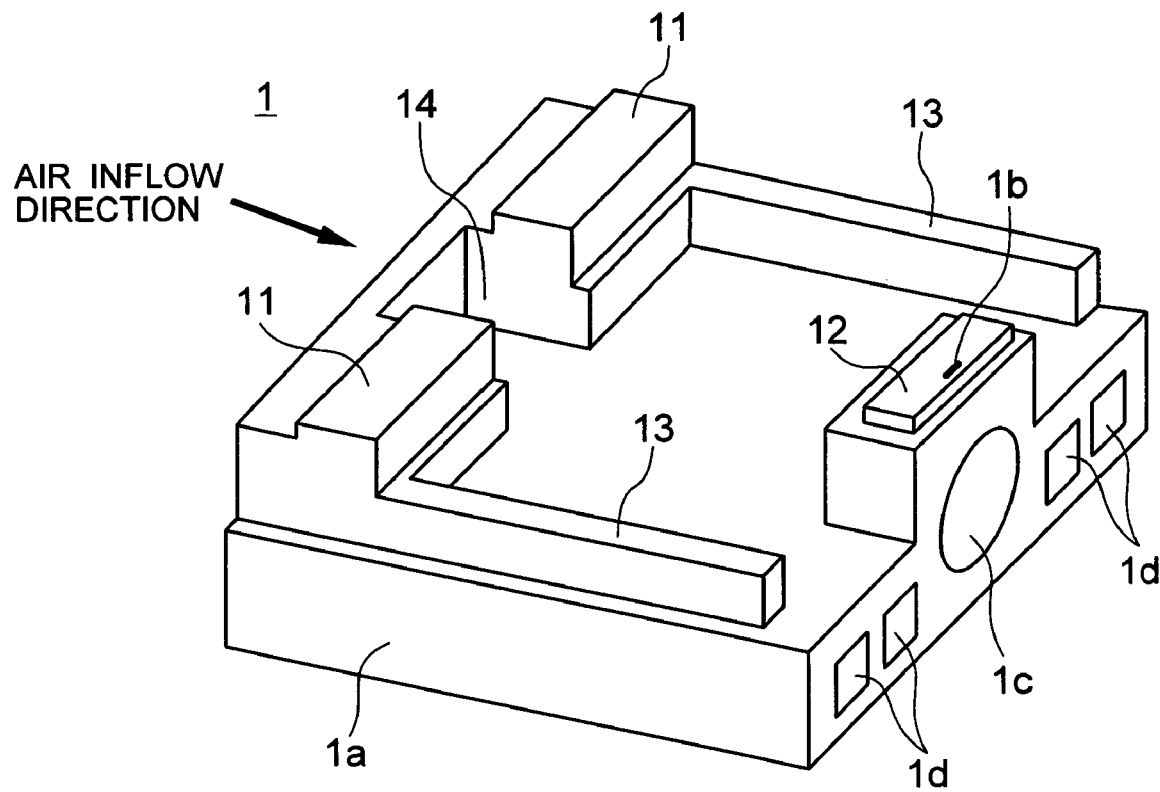
FIG. 16A is a perspective view of the magnetic head slider and its support according to the second embodiment of the invention.
Figure 16B:
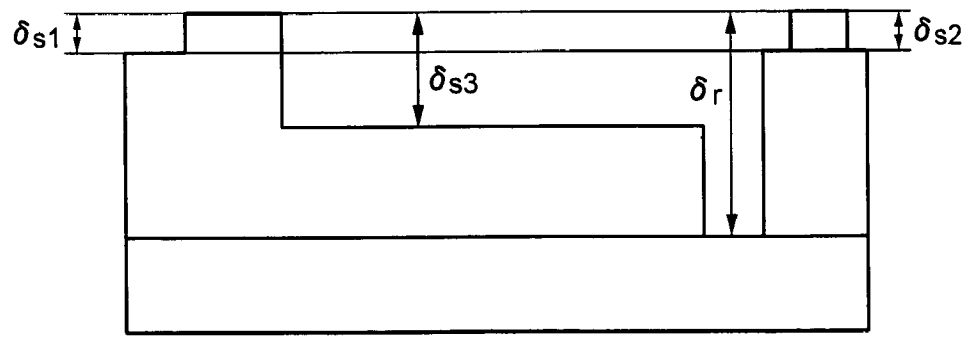
FIG. 16B is a side view of them.

FIG. 16A and FIG. 16B show a perspective view and a side view of the magnetic head slider according to the second embodiment of the invention. The slider 1 is comprised of two (paired) leading pads 11 formed on the air inflow side, a trailing pad 12 formed on the air outflow side, and a pair of side rails 13 formed along the lateral sides.

At a trailing edge of the trailing pad 12, a write/read element 1b comprising an exposed portion of an MR element of an MR read head and a gap portion of an electromagnetic induction type write head is provided, and on a rear end surface of the slider 1, a magnetic head 1c and connection terminals 1d are provided.

The step depth of the leading pads 11, δs1, the step depth of the trailing pad 12, δs2, and the step depth of the side rails 13, δs3, are set such that δs1 and δs2 are equal and δs3 is larger than δs1 and δs2.

Figure 17A:
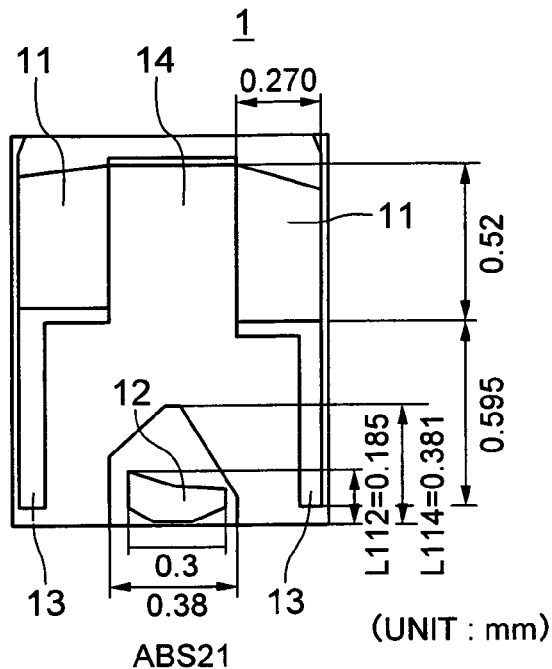
FIG. 17A and FIG. 17B are schematic views respectively showing air bearing surface configurations ABS21 and ABS22 for the magnetic head slider of the second embodiment of the invention.
Figure 17B:
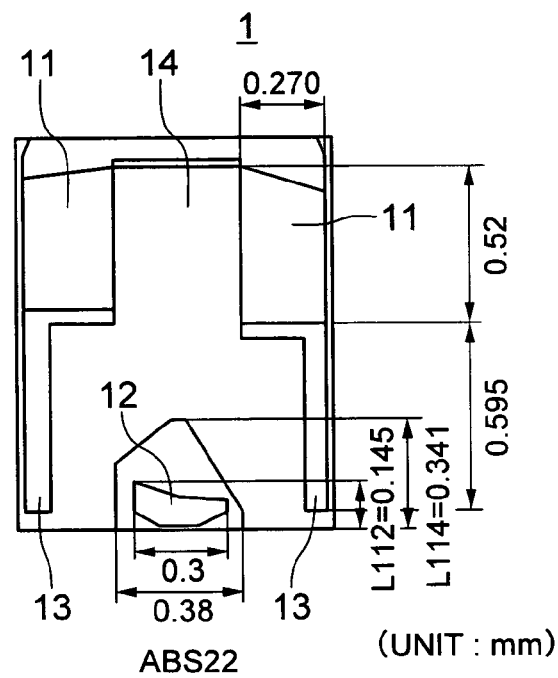

FIGS. 17A and 17B show air bearing surface configurations ABS21, ABS22 for the magnetic head slider of this embodiment. The slider is of a pico-size having a length L of 1.25 mm. The suspension preload F is 29.9 mN, the dimple positions xp/L and yp/L are both 0.5. The length L112 of the contact surface 112 of the trailing pad 12 is 0.185 for ABS21 and 0.145 for ABS22, the length L114 of the stepped surface 114 of the trailing pad 12 is 0.381 for ABS21 and 0.341 for ABS22.

A ratio of an area S of the contact surface 112 of the trailing pad 12 to an area S1 of the contact surface 112 of the leading pads 11 is 0.116 for ABS21 and 0.067 for ABS22. The S/S1 decreases in the order of the air bearing surface configurations ABS1, ABS21 and ABS22. The length L13 of the side rails 13 is 0.595 for both ABS21 and ABS22.

Figure 18:
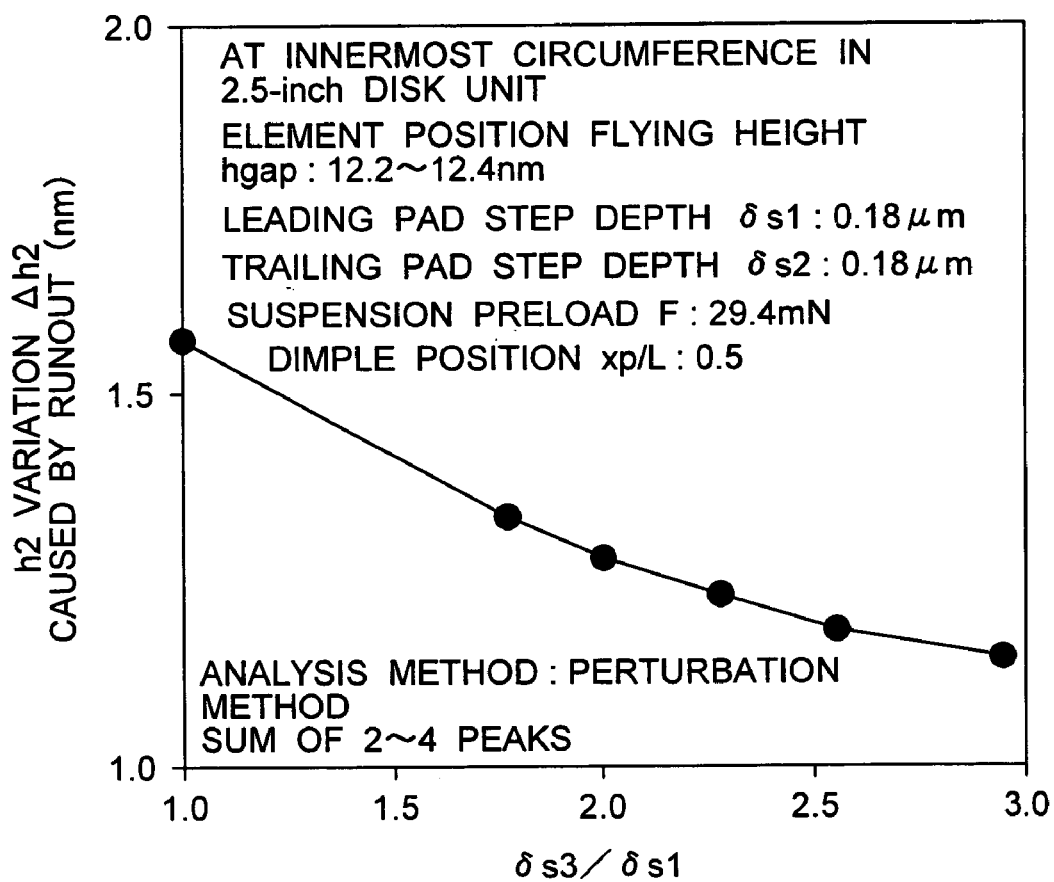
FIG. 18 is a graph showing a calculation result of a fluctuation Δh2 in a flying height h2 at the slider trailing edge with respect to δs3/δs1 for the magnetic head slider of the second embodiment of the invention.

For the air bearing surface configurations ABS21, ABS22 and another air bearing surface configuration having only the lengths L112, L114 of the trailing pad 12 changed as with ABS21, ABS22, FIG. 18 shows a calculation result of a fluctuation Δh2 in the flying height h2 at the slider trailing edge with respect to a ratio of the side rail step depth δs3 to the leading pad step depth δs1, δs3/δs1, when the slider is running over a media surface waviness of a long wavelength compared with the slider length and a large amplitude, such as runout. This calculation was made on the assumption that a slider altitude was 0 m, that a revolution speed and a radius position were those at the innermost circumference of a 2.5-inch disk unit, that the flying height hgap at the element position was 12.2–12.4 nm, and that the leading pad step depth δs1 and the trailing pad step depth δs2 were both held constant at 0.18 μm. The method of calculating Δh2 is the same as that shown in FIG. 8.

Figure 19:
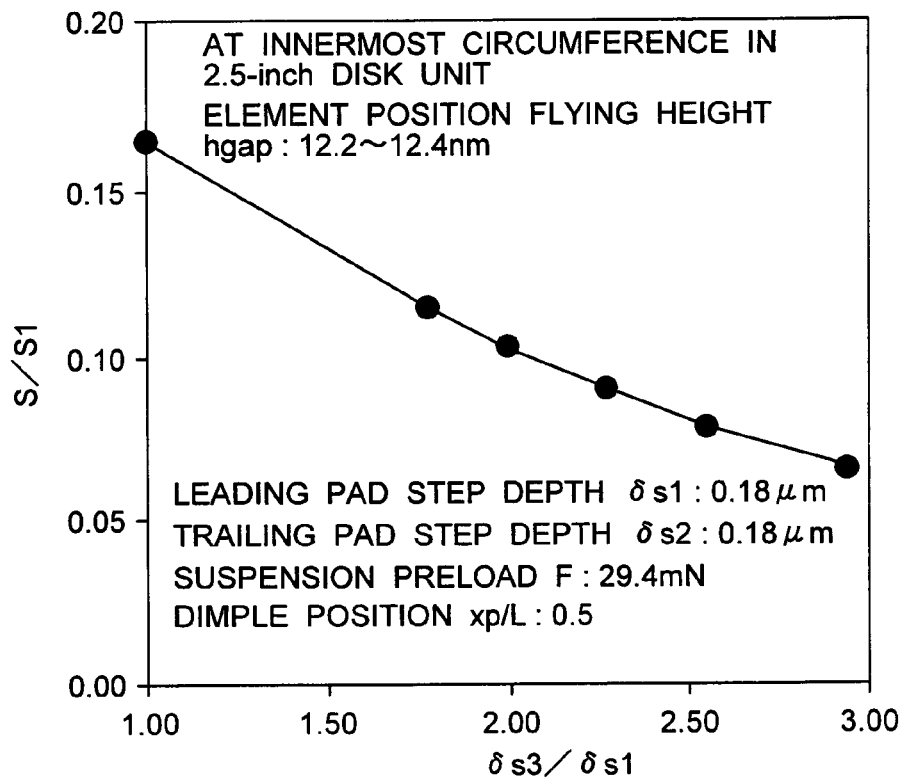
FIG. 19 is a graph showing a calculation result of an S/S1 with respect to δs3/δs1 for the magnetic head slider of the second embodiment of the invention.

For the air bearing surface configurations ABS21, ABS22 and another air bearing surface configuration having only the lengths L112, L114 of the trailing pad 12 changed, FIG. 19 shows a ratio of an area S of the contact surface 112 of the trailing pad 12 to an area S1 of the contact surface 112 of the leading pads 11, S/S1, with respect to δs3/δs1. This was calculated by assuming that a slider altitude was 0 m, that a revolution speed and a radius position were those at the innermost circumference of a 2.5-inch disk unit, that the flying height hgap at the element position was 12.2–12.4 nm, and that the leading pad step depth δs1 and the trailing pad step depth δs2 were both held constant at 0.18 μm. To reduce the flying height fluctuation Δh2 at the slider trailing edge due to the media surface waviness, the S/S1 was reduced. Reducing the S/S1, however, results in a reduced element position flying height hgap. The δs3/δs1 was set large as a measure for keeping the hgap almost constant.

It has been known from FIG. 18 and FIG. 19 that reducing the S/S1 and increasing the δs3/δs1 can reduce the flying height fluctuation Δh2 at the slider trailing edge caused by a media surface waviness of a long wavelength, such as runout, while keeping the hgap almost constant.

Figure 20:
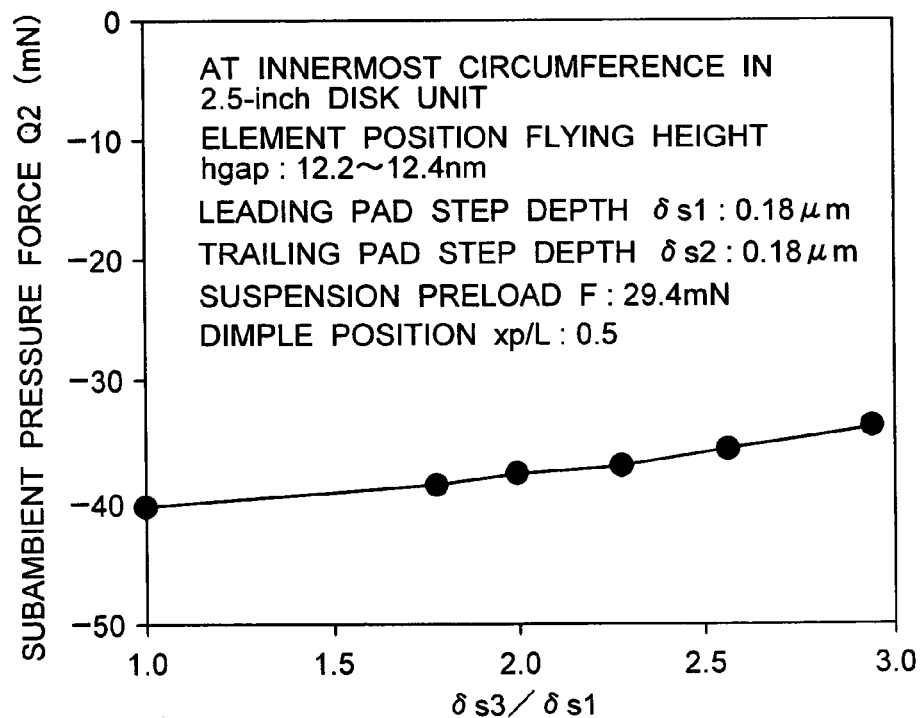
FIG. 20 is a graph showing a calculation result of a subambient pressure force Q2 with respect to δs3/δs1 for the magnetic head slider of the second embodiment of the invention.

For the air bearing surfaces configurations ABS21, ABS22 and another air bearing surface configuration having only the lengths L112, L114 changed, FIG. 20 shows a calculation result of a subambient pressure force Q2 with respect to δs3/δs1. This calculation was made under the condition that a slider altitude was 0 m, that a revolution speed and a radius position were those at the innermost circumference of a 2.5-inch disk unit, that the element position flying height hgap was 12.2–12.4 nm, and that the leading pad step depth δs1 and the trailing pad step depth δs2 were both held constant at 0.18 μm. From the figure, it is seen that increasing the δs3/δs1 reduces an absolute value of the subambient pressure force Q2. When the absolute value of the subambient pressure force Q2 decreases, the flying height increases. That is, the reason why the flying height increases when the δs3/δs1 increases is that the increase in δs3/δs1 causes the absolute value of the subambient pressure force Q2 to decrease.

Figure 21:
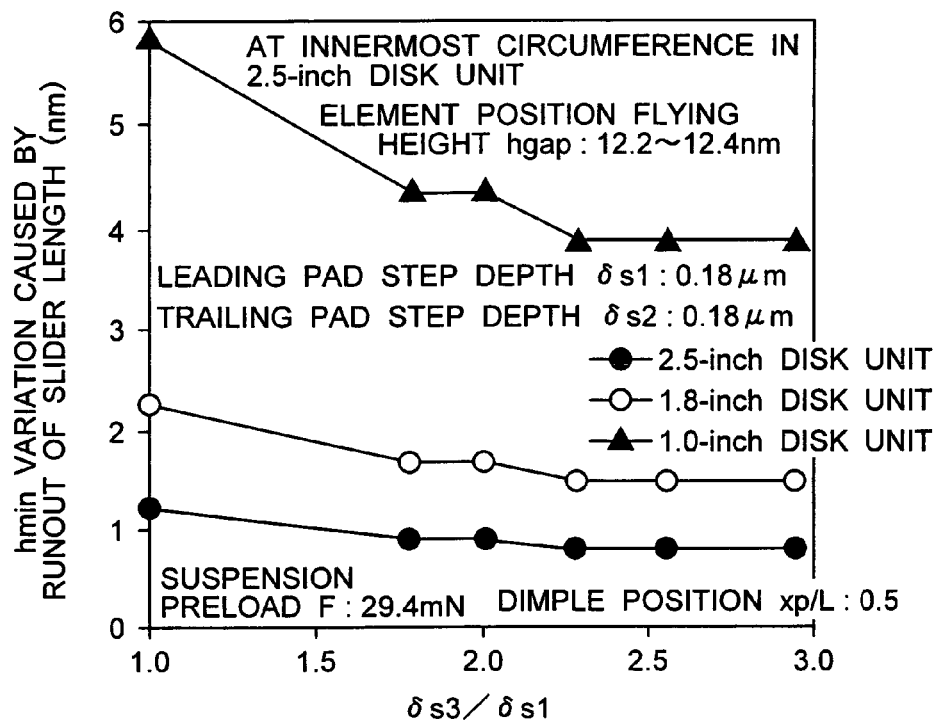
FIG. 21 is a graph showing a calculation result of a fluctuation in the minimum flying height hmin caused by a microwaviness with respect to δs3/δs1 for the magnetic head slider of the second embodiment of the invention.

For the air bearing surface configurations ABS21, ABS22 and another air bearing surface configuration having only the lengths L112, L114 changed, FIG. 21 shows a calculation result of a fluctuation of the minimum flying height hmin caused by a geometrically unfollowable microwaviness of a wavelength almost equal to the slider length and a small amplitude. This fluctuation was calculated under the conditions that a slider altitude was 0 m, that a revolution speed and a radius position were those at the innermost circumference of a 2.5-inch disk unit, that the element position flying height hgap was 12.2–12.4 nm, and that the leading pad step depth δs1 and the trailing pad step depth δs2 were both held constant at 0.18 μm. The method of calculating the fluctuation in the minimum flying height hmin in the 2.5-, 1.8- and 1.0-inch disk unit is the same as that shown in FIG. 11. From FIG. 19 and FIG. 21, it is seen that reducing the S/S1 and increasing the δs3/δs1 can reduce the fluctuation in the minimum flying height hmin due to a geometrically unfollowable microwaviness of a wavelength almost equal to the slider length. This effect is greater for 1.8- and 1.0-inch disk units with smaller radii.

Figure 22:
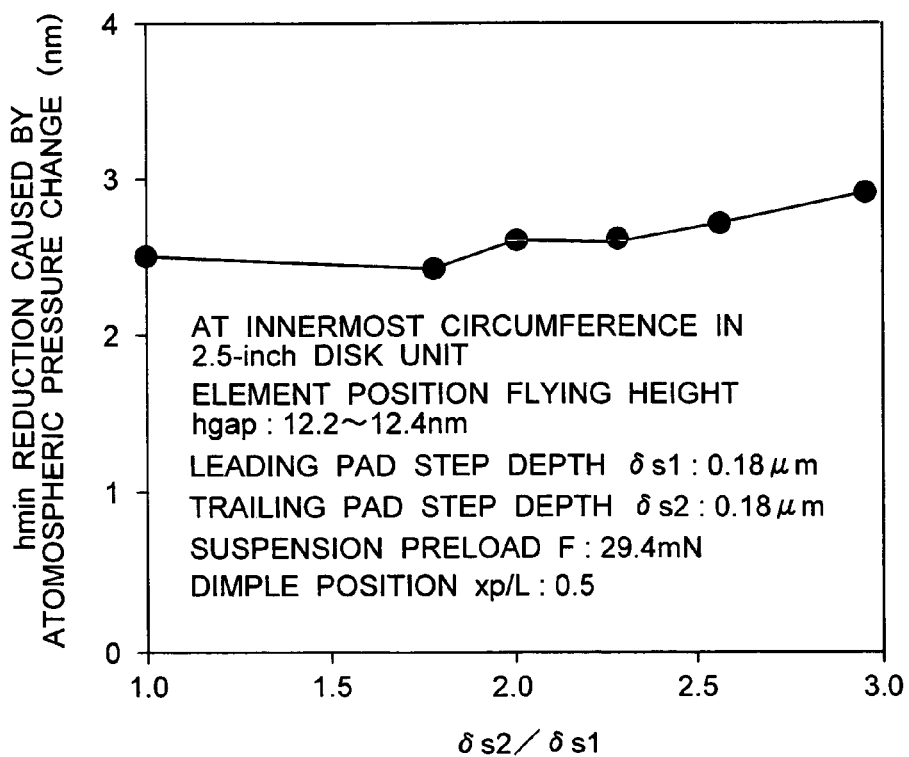
FIG. 22 is a graph showing a calculation result of a reduction in the minimum flying height hmin caused by atmospheric pressure changes around the slider with respect to δs3/δs1 for the magnetic head slider of the second embodiment of the invention.

For the air bearing surface configurations ABS21, ABS22 and another air bearing surface configuration having only the lengths L112, L114 changed, FIG. 22 shows a calculation result of a reduction in the minimum flying height hmin with respect to δs3/δs1 when an atmospheric pressure around the slider changes from 0 m in altitude to 3000 m. This relation was calculated under the conditions that a slider altitude was 0 m, that a revolution speed and a radius position were those at the innermost circumference of a 2.5-inch disk unit, that the element position flying height hgap was 12.2–12.4 nm, and that the leading pad step depth δs1 and the trailing pad step depth δs2 were both held constant at 0.18 μm. FIG. 19 and FIG. 22 indicates that reducing the S/S1 and increasing the δs3/δs1 does not increase the hmin reduction caused by the atmospheric pressure change and that the hmin reduction caused by the atmospheric pressure change for δs3/δs1=2.227 is only 0.1 nm larger than when δs3/δs1=1 which is used in the conventional art. Therefore, the hmin reduction due to atmospheric pressure changes does not increase when the absolute value of the subambient pressure force Q2 decreases.

Figure 23A:
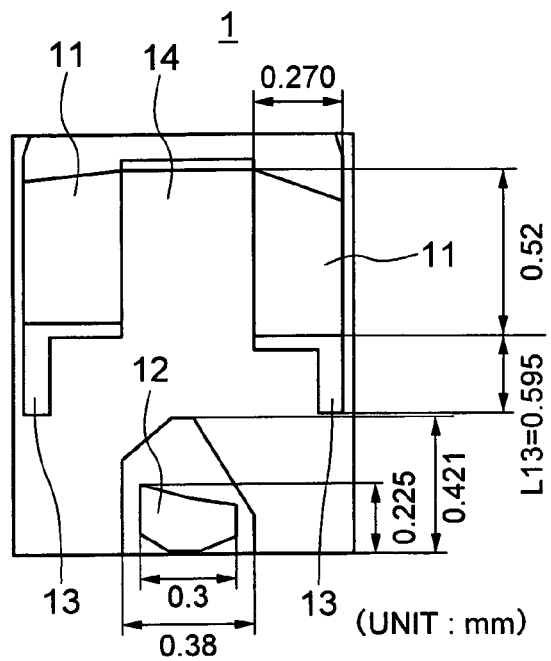
FIG. 23A is a schematic diagram showing the air bearing surface configuration ABS11 of a magnetic head slider as an example 2 for comparison.

FIG. 23A shows the air bearing surface configuration ABS11 of a magnetic head slider as an example 2 for comparison. The slider is of a pico-size having a length L of 1.25 mm. The suspension preload F is 29.4 mN, and the dimple positions xp/L, yp/L are both 0.5. The length L112 of the contact surface 112 of the trailing pad 12 is 0.225 mm, the length L114 of the stepped surface 114 of the trailing pad 12 is 0.421 mm, the length L13 of the side rails 13 is 0.239 mm, and the ratio of an area S1 of the contact surface 112 of the trailing pad 12 to an area S1 of the contact surface 112 of the leading pads 11, S/S1, is 0.164. The length L13 of the side rails 13 of the air bearing surface configuration ABS11 is 0.356 mm shorter than that of ABS1 and other geometries of the ABS11 are the same as those of ABS1. The step depths δs1, δs2, δs3 are equal.

Figure 23B:
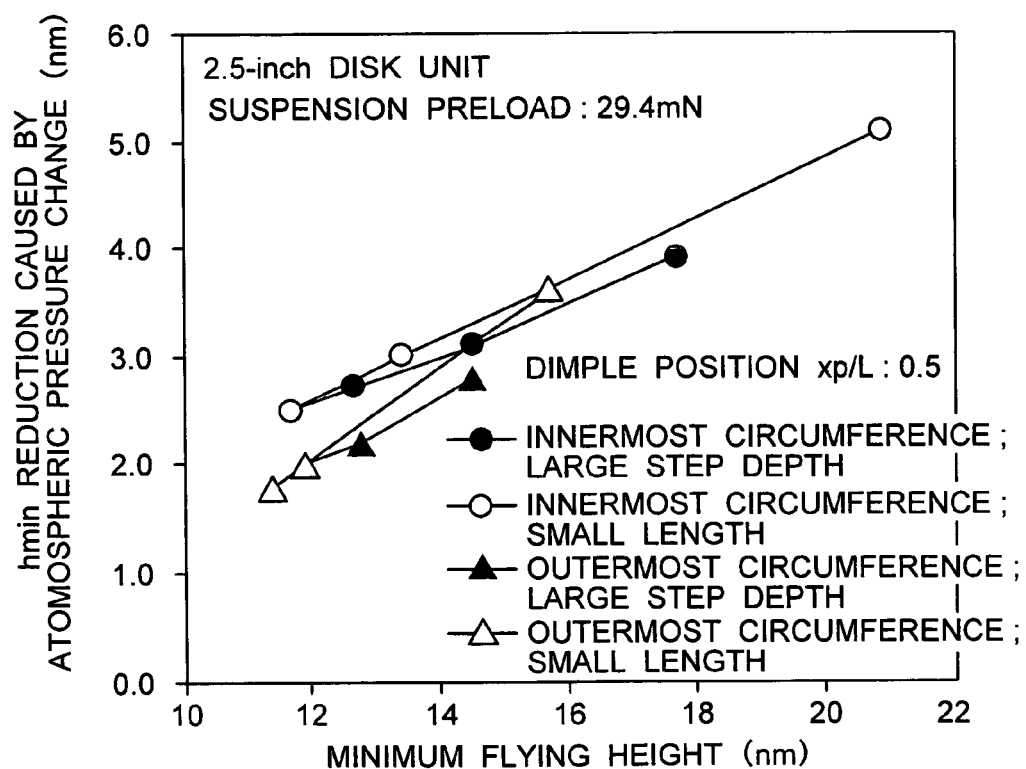
FIG. 23B is a graph showing a calculation result of a reduction in the minimum flying height hmin caused by atmospheric pressure changes around the slider with respect to the minimum flying height hmin, for the magnetic head slider of the second embodiment of the invention and for the comparison example 2.

FIG. 23B shows a calculation result of a reduction in the hmin when an atmospheric pressure around the slider changes from 0 m in altitude to 3000 m under the condition that a revolution speed and a radius position are those at the innermost and outermost circumferences of a 2.5-inch disk unit. The hmin reduction was calculated for two cases. In the first case, for the air bearing surface configuration ABS1 of the second embodiment, the minimum flying height hmin is increased by increasing the ratio of the side rail step depth δs3 to the leading pad step depth δs1, δs3/δs1, with δs2/δs1 set to 1. In the second case, for another air bearing surface configuration having only the side rail length L3 varied as with the air bearing surface configurations ABS1, ABS11, the hmin is increased by reducing the side rail length L3 under the condition of δs1=δs2=δs3. FIG. 24 shows that, for the same hmin, the hmin reduction due to the atmospheric pressure change when the hmin is increased by increasing δs3/δs1 of the second embodiment is smaller than the hmin reduction when the hmin is increased by reducing the side rail length of the comparison example.

The working mechanism of the magnetic head slider and its support in the first and second embodiment of this invention will be explained with reference to FIG. 24A and FIG. 24B.

Figure 24A:
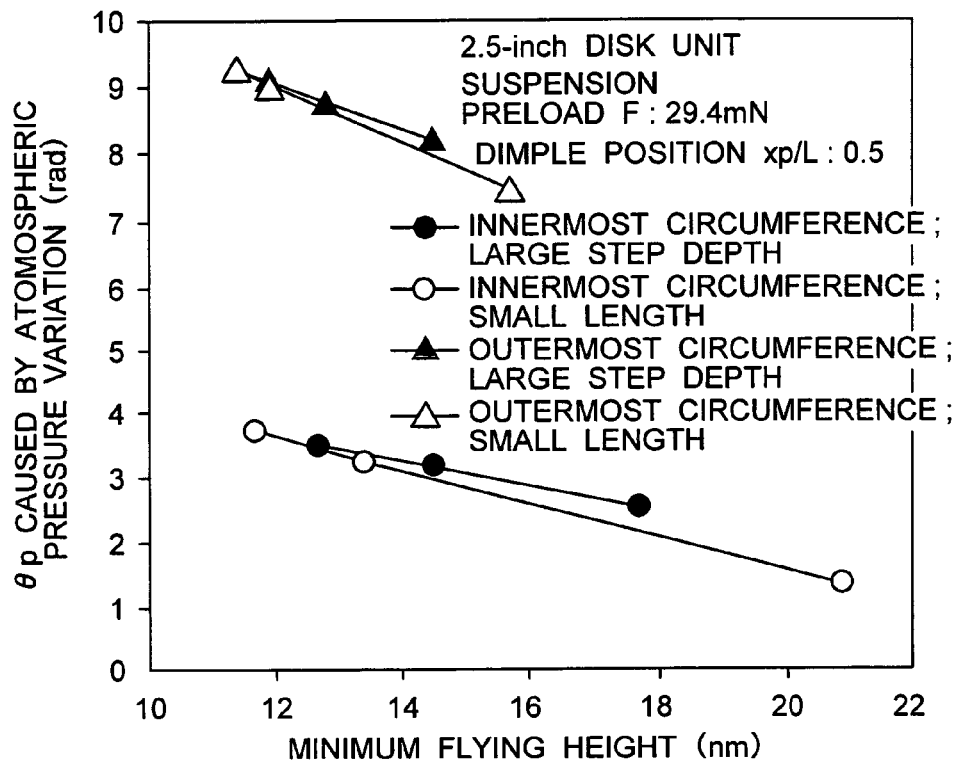
FIG. 24A is a graph showing a calculation result of a pitch attitude angle θp difference caused by atmospheric pressure changes around the slider with respect to the minimum flying height hmin for the magnetic head slider of the second embodiment of the invention and for the comparison example 2.

FIG. 24A shows a calculation result of, with respect to the hmin, a differential between a pitch attitude angle θp at an altitude of 0 m and a pitch attitude angle θp at an altitude of 3000 m under the condition that a revolution speed and a radius position are those at the innermost and outermost circumferences of a 2.5-inch disk unit. This was calculated for two cases. In the first case, for the the air bearing surface configuration ABS1 of the second embodiment, the minimum flying height hmin is increased by increasing the ratio δs3/δs1, with δs2/δs1=1. In the second case, for another air bearing surface configuration having only the side rail length L3 varied as with the air bearing surface configurations ABS1, ABS11, the hmin is increased by reducing the side rail length L3 under the condition of δs1=δs2=δs3. FIG. 24A shows that, for the same hmin, the θp change caused by the atmospheric pressure change when the hmin is increased by increasing δs3/δs1 of the second embodiment is larger than the θp change when the hmin is increased by reducing the side rail length of the comparison example.

Figure 24B:
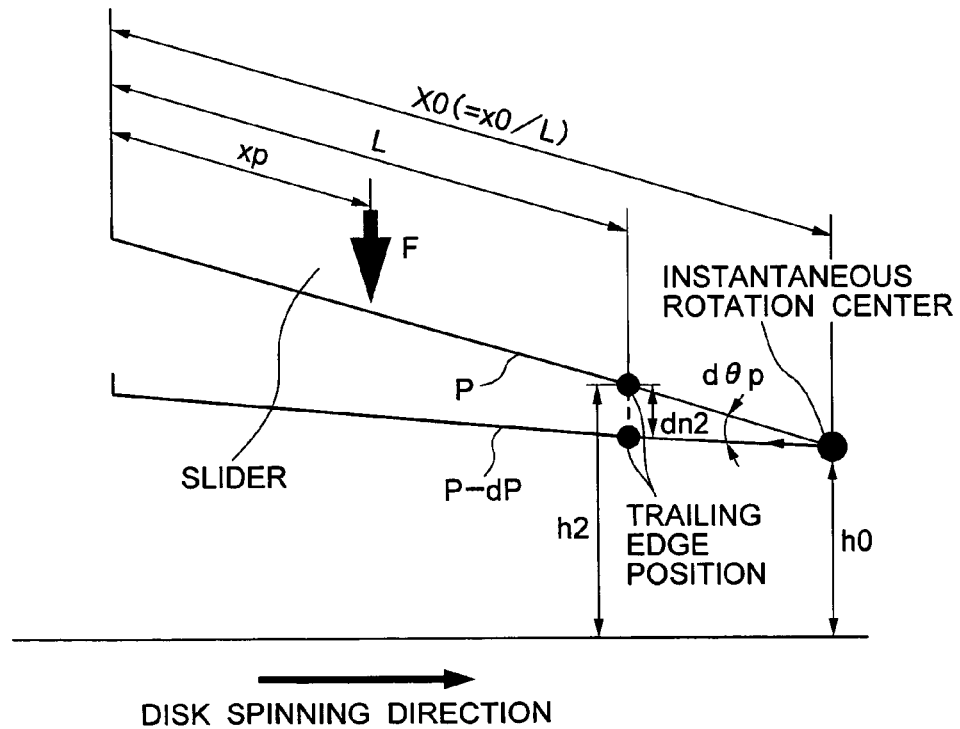
FIG. 24B is a diagram for explaining the working mechanism of the magnetic head slider and its support of the second embodiment of the invention.
Figure 25:
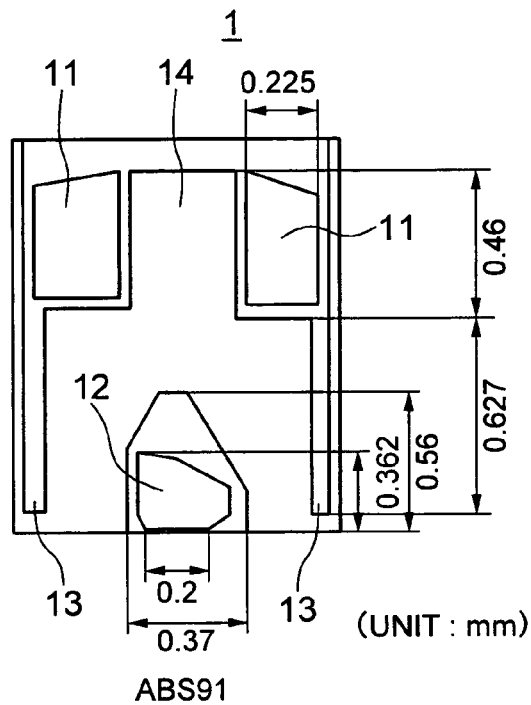
FIG. 25 is a schematic diagram showing the air bearing surface configuration ABS91 of a magnetic head slider as an example 3 for comparison.
Figure 26:
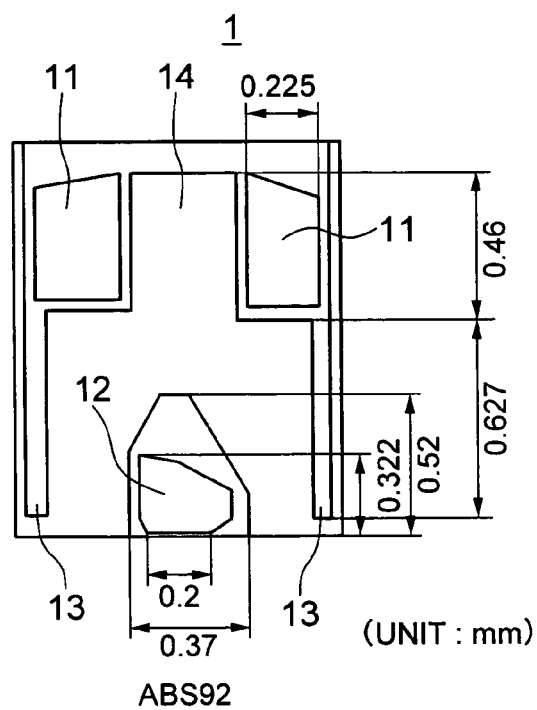
FIG. 26 is a schematic diagram showing the air bearing surface configuration ABS92 of a magnetic head slider as an example 4 for comparison.
Figure 27:
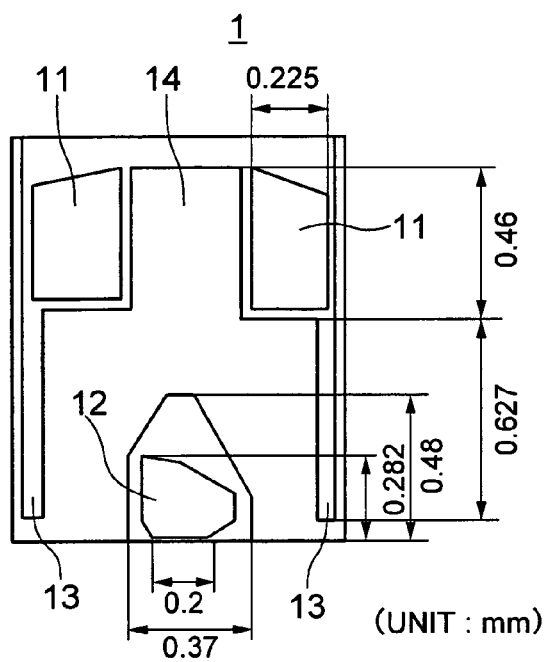
FIG. 27 is a schematic diagram showing the air bearing surface configuration ABS93 of a magnetic head slider as an example 5 for comparison.
Figure 28:
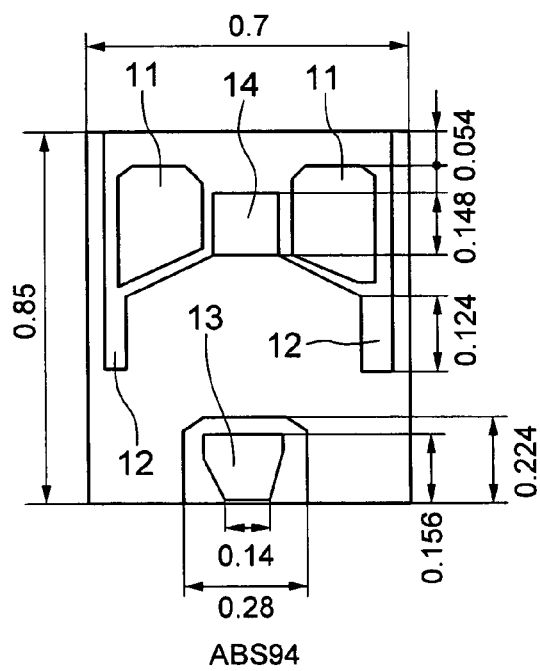
FIG. 28 is a schematic diagram showing the air bearing surface configuration ABS94 of a magnetic head slider as an example 6 for comparison.
Figure 29:
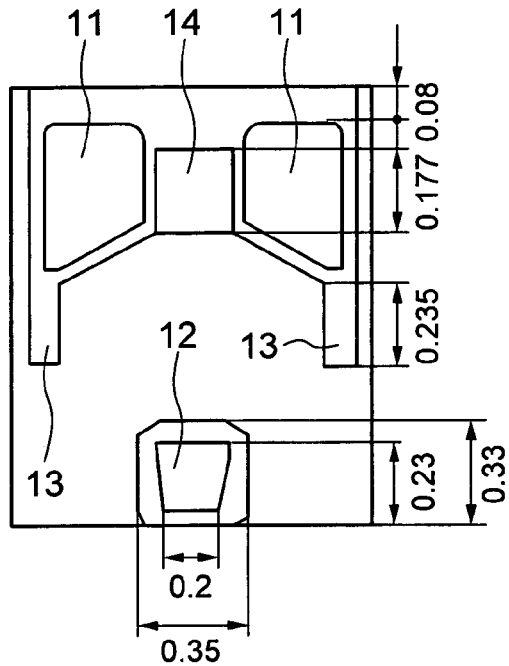
FIG. 29 is a schematic diagram showing the air bearing surface configuration ABS95 of a magnetic head slider as an example 7 for comparison.
Figure 30:
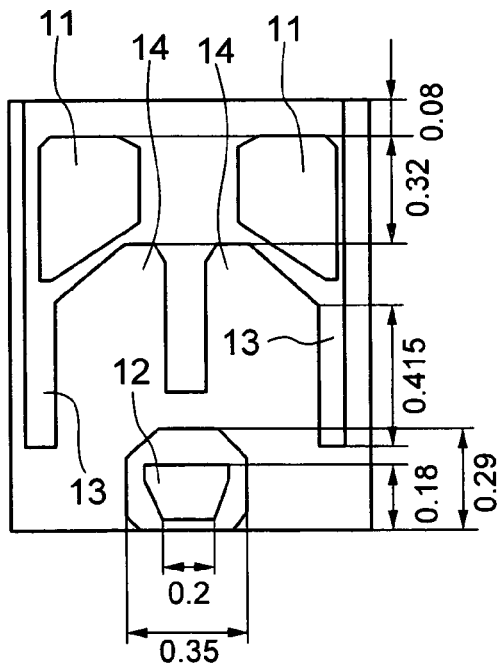
FIG. 30 is a schematic diagram showing the air bearing surface configuration ABS96 of a magnetic head slider as an example 8 for comparison.
Figure 31:
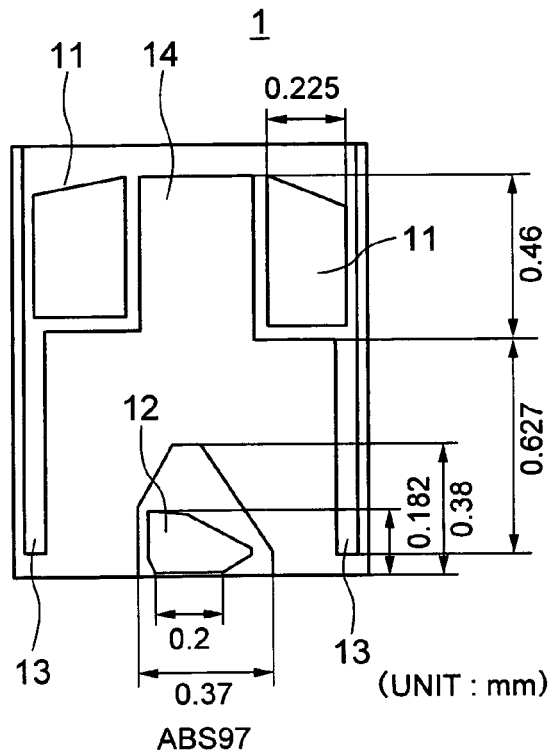
FIG. 31 is a schematic diagram showing the air bearing surface configuration ABS97 of a magnetic head slider as an example 9 for comparison.
Figure 32:
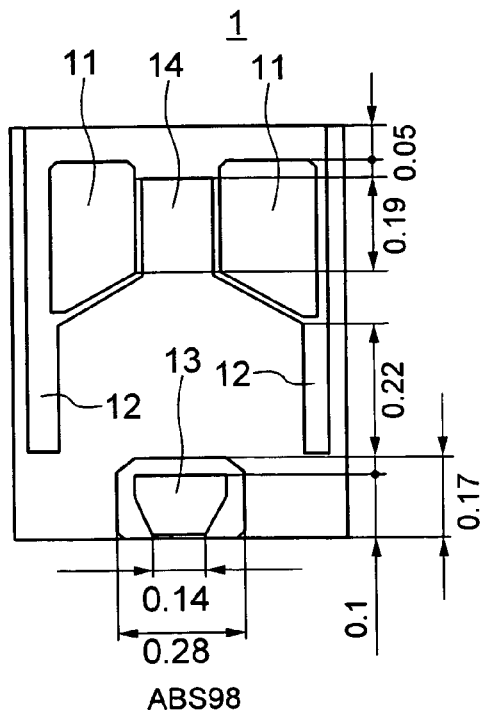
FIG. 32 is a schematic diagram showing the air bearing surface configuration ABS98 of a magnetic head slider as an example 10 for comparison.
Figure 33:
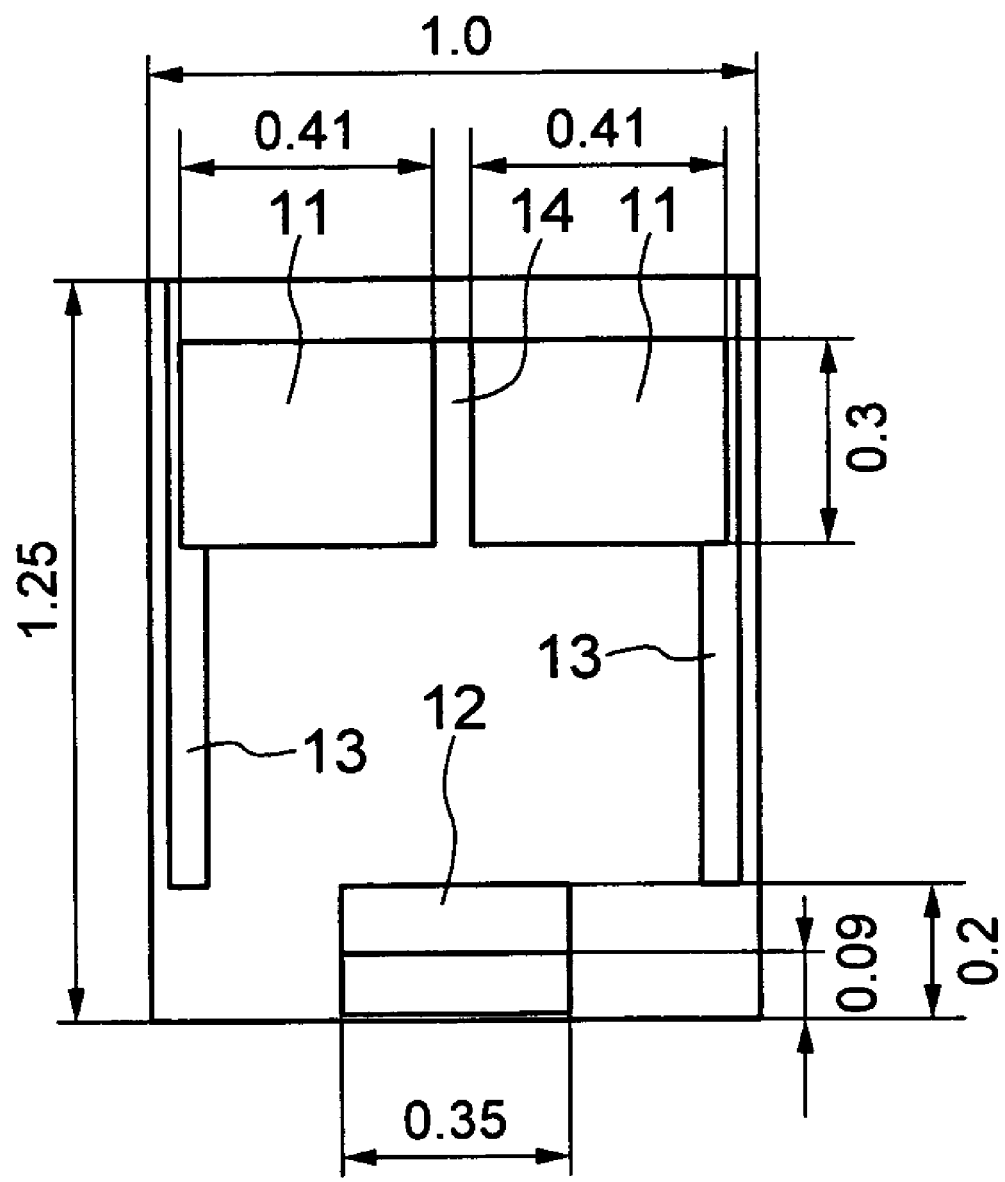
FIG. 33 is a schematic diagram showing the air bearing surface configuration ABS99 of a magnetic head slider as an example 11 for comparison.

As shown in FIG. 24B, when the atmospheric pressure around the slider falls, the pitch attitude angle θp of the slider 1 changes. If an instantaneous revolution center for the pitch attitude angle change is located at the trailing edge, the flying height h2 at the slider trailing edge does not change. The invention increases the pitch attitude angle change by moving a positive pressure force center position toward the inflow side to put the instantaneous revolution center closer to the trailing edge, thereby preventing the flying height h2 at the trailing edge from varying even when the atmospheric pressure around the slider falls.

Referring to FIG. 25 to FIG. 35, the working mechanism of the magnetic head slider of the second embodiment thus described will be explained.

FIG. 25 to FIG. 33 show the air bearing surface configurations ABS91–99 of magnetic head sliders as examples 3–11 for comparison. The air bearing surfaces ABS91–93, 95–97, 99 are of a pico-size having a slider length L of 1.25 mm, and the air bearing surface configurations ABS94, 98 are of a femto-size having a slider length L of 0.85 mm. Ratios of an area S of the contact surface 112 of the trailing pad 12 to an area S1 of the contact surface 112 of the leading pads 11, S/S1, for the air bearing surface configurations ABS91–99 are 0.460, 0.398, 0.335, 0.260, 0.253, 0.190, 0.178, 0.144, and 0.128 respectively. The step depths δs1, δs2, δs3 for ABS91–99 are all equal to each other.

Figure 34:
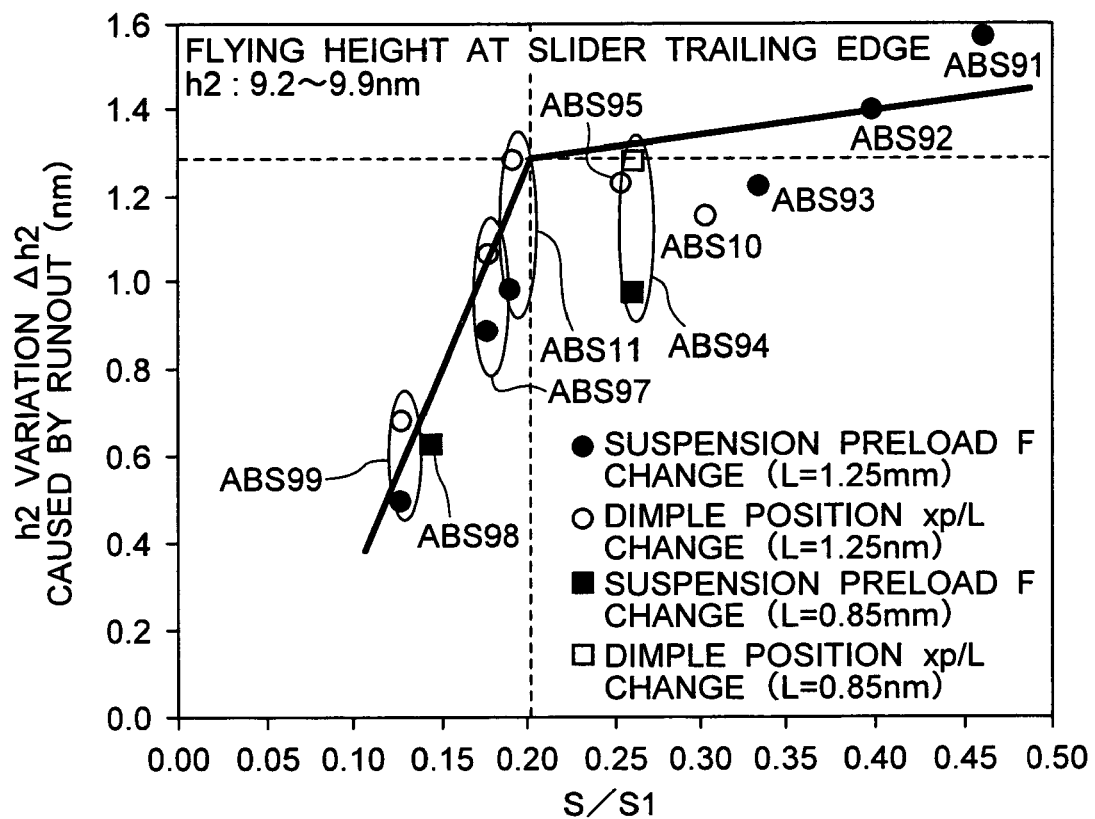
FIG. 34 is a graph showing a calculation result of a fluctuation Δh2 in a flying height h2 at the slider trailing edge with respect to a ratio of contact surface areas of the leading and trailing pads, S/S1.

For the air bearing surface configurations ABS10, ABS91–99, FIG. 34 shows a calculation result of a fluctuation Δh2 in the flying height h2 at the slider trailing edge with respect to S/S1 when the slider is running over a medium surface waviness of a longer-than-slider-length wavelength and a large amplitude, such as runout. This was calculated by assuming that the slider altitude was 0 m and that a revolution speed and a radius position were those at the innermost circumference of a 2.5-inch disk unit, and that the flying height h2 at the slider trailing edge was 9.2–9.9 nm. The method of calculating Δh2 is the same as that shown in FIG. 8. From the figure, it is seen that if the slider length L, suspension preload F and dimple position xp/L should change, the flying height fluctuation Δh2 at the slider trailing edge caused by the media surface waviness can be reduced as long as the S/S1 is 0.2 or less.

Figure 35:
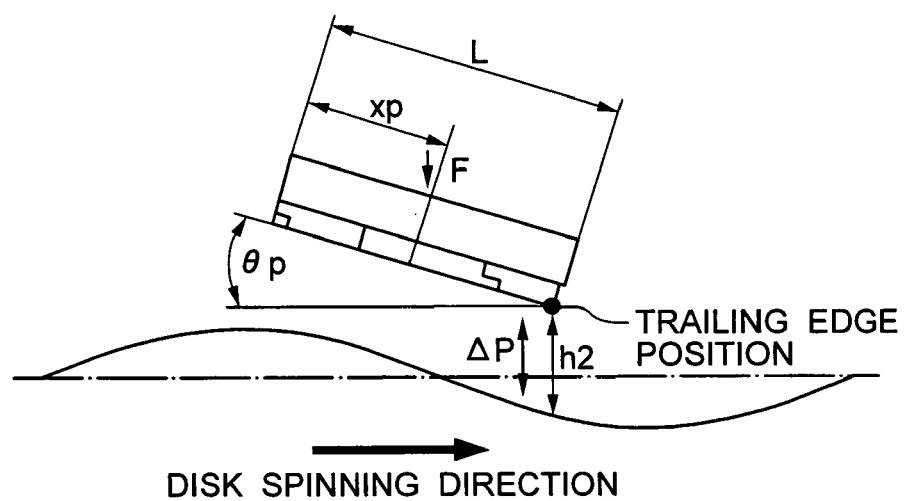
FIG. 35 is a side view for explaining the working of the magnetic head slider and its support of the second embodiment of the invention.

As shown in FIG. 35, when a slider runs over a media surface waviness of a long wavelength, such as runout, a pressure fluctuation occurs between the air bearing surface of the slider and the waved media surface, and the flying height changes. The smaller the area of the contact surface that can form the air bearing surface where pressure fluctuations occur, the smaller the flying height fluctuation will be. This invention reduces the area of the contact surface that forms the air bearing surface where pressure fluctuations occur to thereby reduce the flying height fluctuation due to the media surface waviness of a long wavelength, such as runout. This invention also reduces geometrically the flying height fluctuation caused by microwaviness of a length almost equal to the slider length and a small amplitude.

Figure 36A:
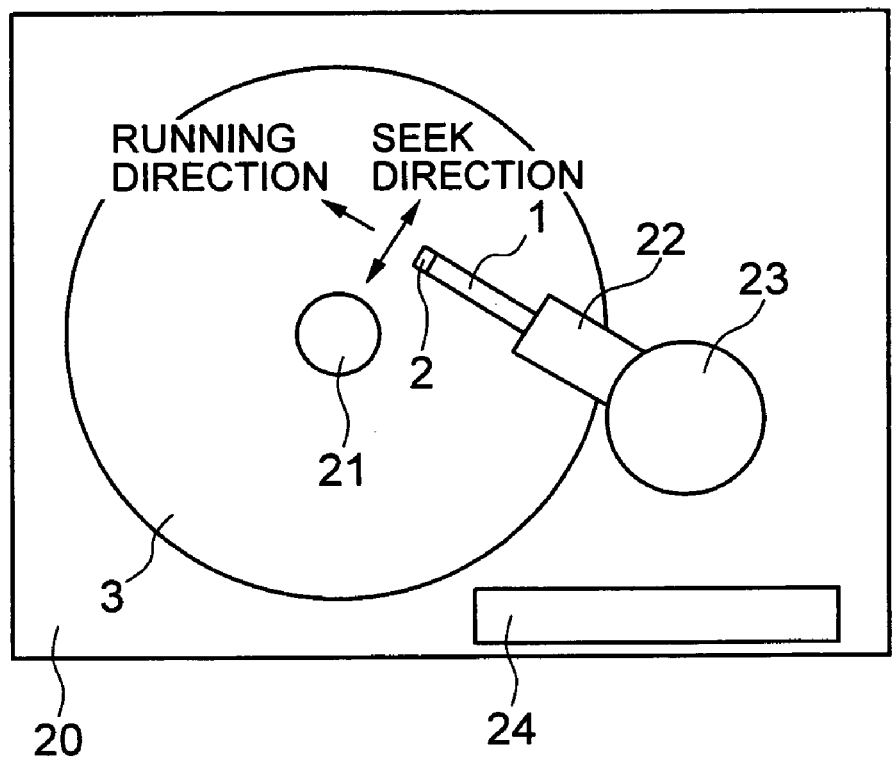
FIG. 36A is a plan view showing an embodiment of a magnetic disk unit according to the invention.
Figure 36B:
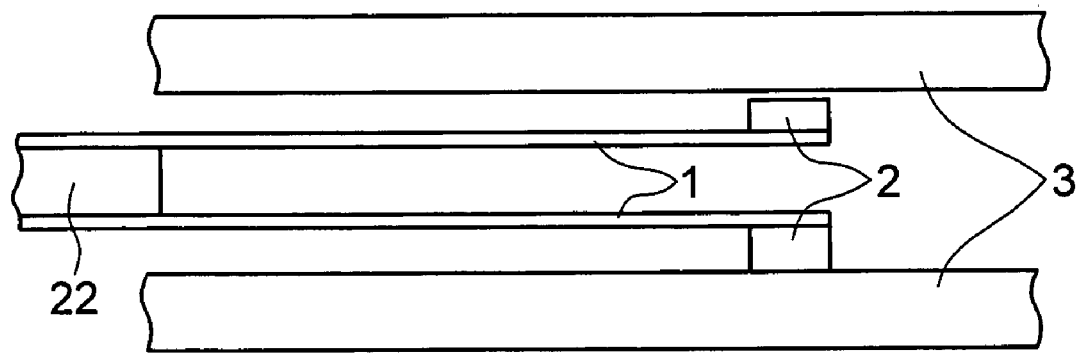
FIG. 36B is a side view thereof.

FIGS. 36A and 36B show an embodiment of a magnetic disk unit according to the invention. The magnetic disk unit 30 of the figure is in a state where the slider 1 is running and in a seeking operation while flying above the surface of a recording medium 3.

The magnetic disk unit 30 of this embodiment is comprised of a magnetic recording medium 3, a drive unit 31 for rotating the medium, a support arm 32 for positioning the magnetic head slider 1 of this invention and its support 2, a drive unit 33 for the support arm 32, and a circuit 34 for processing write/read signals to and from the magnetic head mounted on the slider 1.

The magnetic head slider 1 mounted in this magnetic disk unit is constructed such that the leading pad step depth (δs1) of the slider, the trailing pad step depth (δs2) and the side rail step depth (δs3) with respect to the contact surfaces of the slider and disk are in a relation of δs1<δs2<δs3, and with this construction, the slider, which may follow the waviness of the disk surface and maintain a low flying height while having a small flying height fluctuation, can be provided.

As described above, according to the invention, in the magnetic head slider, the support therefor and the magnetic disk unit, by appropriately specifying the leading pad step depth, the side rail step depth of the slider, etc., a flying height fluctuation with respect to a media surface waviness of a long wavelength such as runout is reduced without reducing the slider flying height, and thereby a slider flying characteristic, which is suited to a high areal density of the media surface, can be provided.

While the present invention has been described in conjunction with the above embodiments, it is apparent to those skilled in the art that various modifications and changes can be made without departing from the spirit of this invention and the scope of the appended claims.

The invention claimed is:

1. A magnetic head slider for supporting a magnetic head above a rotating disk, comprising:
    a slider body;
    two leading pads formed on an air inflow side of the slider body with a stepped surface provided in each of the leading pads, each of the leading pads having an air bearing surface coming into contact with a medium surface of the disk when the disk is at rest;
    a trailing pad formed on an air outflow side of the slider body with a stepped surface provided in the trailing pad, the trailing pad having an air bearing surface coming into contact with the medium surface of the disk when the disk is at rest;
    a pair of side rails formed along both lateral sides of the slider body; and
    said leading pads having a depth $\delta s1$ from the air bearing surfaces thereof to the stepped surfaces formed on the air inflow side of the leading pads, said trailing pad having a depth $\delta s2$ from the air bearing surface thereof to the stepped surface formed on the air inflow side of the trailing pad and said side rails having a step depth $\delta s3$ from the air bearing surfaces of the leading and trailing pads to surfaces of the side rails, said depths $\delta s1$, $\delta s2$ and $\delta s3$ being in a predetermined relation, where at least one of $\delta s3 > \delta s1$ and $\delta s3 > \delta s2$.

2. A magnetic head slider support for supporting a magnetic head above a rotating disk, comprising:
    a load beam portion;
    a gimbal portion swingably mounted to the load beam portion;
    a magnetic head slider mounted on the gimbal portion;
    a dimple formed on the load beam portion and coming in contact with the magnetic head slider to apply the load from the beam portion to the magnetic head slider; and
    the magnetic head slider comprising:
    a slider body;
    two leading pads formed on an air inflow side of the slider body with a stepped surface provided in each of the leading pads, each of the leading pads having an air bearing surface coming into contact with a medium surface of the disk when the disk is at rest;
    a trailing pad formed on an air outflow side of the slider body with a stepped surface provided in the trailing pad, the trailing pad having a air bearing surface coming into contact with the medium surface of the disk when the disk is at rest;
    a pair of side rails formed along both lateral sides of the slider body; and
    said leading pads having a depth $\delta s1$ from the air bearing surfaces thereof to the stepped surfaces formed on the air inflow side of the leading pads, said trailing pad having a depth $\delta s2$ from the air bearing surface thereof to the stepped surface formed on the air inflow side of the trailing pad and said side rails having a step depth $\delta s3$ from the air bearing surfaces of the leading and trailing pads to surfaces of the side rails, said depths $\delta s1$, $\delta s2$ and $\delta s3$ being in a predetermined relation, where at least one of $\delta s3 > \delta s1$ and $\delta s3 > \delta s2$.

3. A magnetic disk unit comprising:
    a magnetic recording medium;
    a drive unit for spinning the magnetic recording medium;
    a magnetic head for writing and reading information to and from the magnetic recording medium; a slider for mounting a magnetic head;
    a support for supporting the magnetic head slider;
    a drive unit for driving the support relative to the magnetic recording medium;
    a circuit for processing a write/read signal to and from the magnetic head; and
    the magnetic head slider comprising:
    a slider body;
    two leading pads formed on an air inflow side of the slider body with a stepped surface provided in each of the leading pads, each of the leading pads having an air bearing surface coming into contact with a medium surface of the disk when the disk is at rest;
    a trailing pad formed on an air outflow side of the slider body with a stepped surface provided in the trailing pad, the trailing pad having an air bearing surface coming into contact with the medium surface of the disk when the disk is at rest;
    a pair of side rails formed along both lateral sides of the slider body; and
    said leading pads having a depth $\delta s1$ from the air bearing surfaces thereof to the stepped surfaces formed on the air inflow side of the leading pads, said trailing pad having a depth $\delta s2$ from the air bearing surface thereof to the stepped surface formed on the air inflow side of the trailing pad and said side rails having a step depth $\delta s3$ from the air bearing surfaces of the leading and trailing pads to surfaces of the side rails, said depths $\delta s1$, $\delta s2$ and $\delta s3$ being in a predetermined relation, where at least one of $\delta s3 > \delta s1$ and $\delta s3 > \delta s2$.

4. A magnetic head slider according to claim 1, wherein the predetermined relation further includes that $\delta s2$ is one of equal to and greater than $\delta s1$.

5. A magnetic head slider according to claim 1, wherein the predetermined relation further includes that $\delta s2$ is greater than $\delta s1$.

6. A magnetic head slider according to claim 1, wherein the predetermined relation includes that $\delta s2 = \delta s1$.

7. A magnetic head slider according to claim 2, wherein the predetermined relation further includes that $\delta s2$ is one of equal to and greater than $\delta s1$.

8. A magnetic head slider according to claim 2, wherein the predetermined relation further includes that $\delta s2$ is greater than $\delta s1$.

9. A magnetic head slider according to claim 2, wherein the predetermined relation includes that $\delta s2 = \delta s1$.

10. A magnetic disk unit according to claim 3, wherein the predetermined relation further includes that $\delta s2$ is one of equal to and greater than $\delta s1$.

11. A magnetic disk unit according to claim 3, wherein the predetermined relation further includes that $\delta s2$ is greater than $\delta s1$.

12. A magnetic disk unit according to claim 3, wherein the predetermined relation includes that $\delta s2 = \delta s1$.

* * * * *